United States Patent
Baricuatro, Jr. et al.

(10) Patent No.: US 9,558,345 B2
(45) Date of Patent: Jan. 31, 2017

(54) STORAGE MEDIUM RECORDING DISPLAY CONTROL PROGRAM FOR FUNCTION SETTING, METHOD FOR OPERATING DISPLAY CONTROL PROGRAM, AND ELECTRONIC DEVICE INCLUDING THE SAME

(71) Applicant: KYOCERA Document Solutions Inc., Osaka (JP)

(72) Inventors: Manuel Baricuatro, Jr., Cebu (PH); Joseph Cyril Peral, Cebu (PH); Gestoni Bacalso, Cebu (PH); May Giltendez, Cebu (PH); Lianney Deleverio, Cebu (PH); Anthony Olores, Cebu (PH); Fernando Dagoc, Jr., Cebu (PH); El Parac, Cebu (PH); Neil Patrick Managaytay, Cebu (PH); Alvin Ray Yu, Cebu (PH); Criselle Zion Ampo, Cebu (PH)

(73) Assignee: KYOCERA Document Solutions Inc. (JP)

(*) Notice: Subject to any disclaimer, the term of this patent is extended or adjusted under 35 U.S.C. 154(b) by 81 days.

(21) Appl. No.: 14/682,689

(22) Filed: Apr. 9, 2015

(65) Prior Publication Data
US 2015/0294105 A1    Oct. 15, 2015

(30) Foreign Application Priority Data

Apr. 15, 2014 (JP) ................................. 2014-083845

(51) Int. Cl.
G06F 21/00 (2013.01)
G06F 21/44 (2013.01)
(Continued)

(52) U.S. Cl.
CPC ............ *G06F 21/44* (2013.01); *G06F 9/4881* (2013.01); *G06F 21/6245* (2013.01); *H04W 12/06* (2013.01)

(58) Field of Classification Search
CPC .... G06F 21/44; G06F 21/6245; G06F 9/4881; H04W 12/06
(Continued)

(56) References Cited

U.S. PATENT DOCUMENTS 6,243,857 B1 * 6/2001 Logan, III ................ G06F 8/34
714/E11.21
9,019,515 B2 * 4/2015 Takai ................... G03G 15/502
358/1.13

(Continued)

FOREIGN PATENT DOCUMENTS

JP    2012-095138 A    5/2012

*Primary Examiner* — Sarah Su
(74) *Attorney, Agent, or Firm* — McDonnell Boehnen Hulbert & Berghoff LLP

(57) ABSTRACT

An electronic device includes an authentication section that authenticates a user of the electronic device, an operation section that includes a display section and operates the electronic device, a storage section that stores programs that each cause the electronic device to perform a job in accordance with a preliminarily set content, and a program processing section that generates a program associated with the user authenticated in the authentication section. Using the operation section, a first user specifies a program to be shared and a second user permitted to use the shared program. As such, the first user who permits to share the program shares the program with the second user.

18 Claims, 18 Drawing Sheets

(51) Int. Cl.
*G06F 9/48* (2006.01)
*G06F 21/62* (2013.01)
*H04W 12/06* (2009.01)

(58) Field of Classification Search
USPC .................................................. 726/17, 28
See application file for complete search history.

(56) References Cited

U.S. PATENT DOCUMENTS

| | | | |
|---|---|---|---|
| 2005/0125677 A1* | 6/2005 | Michaelides | H04L 9/321 |
| | | | 713/185 |
| 2010/0205284 A1* | 8/2010 | Newton | H04L 41/0806 |
| | | | 709/222 |
| 2011/0164269 A1* | 7/2011 | Kamishiro | G06F 21/31 |
| | | | 358/1.13 |
| 2011/0255115 A1* | 10/2011 | Tokuda | G06F 3/1205 |
| | | | 358/1.13 |
| 2012/0096544 A1* | 4/2012 | Hosoda | G06F 21/41 |
| | | | 726/19 |
| 2015/0358316 A1* | 12/2015 | Cronin | H04L 63/0861 |
| | | | 726/6 |

* cited by examiner

STORAGE MEDIUM RECORDING DISPLAY CONTROL PROGRAM FOR FUNCTION SETTING, METHOD FOR OPERATING DISPLAY CONTROL PROGRAM, AND ELECTRONIC DEVICE INCLUDING THE SAME

BACKGROUND

The present disclosure relates to a technology capable of omitting a setting operation for an electronic device such as an image forming apparatus.

In an electronic device, such as an image forming apparatus, various functions that improve user convenience are added. A function called a program function is one of such functions. The program function provides a capability to omit a setting operation for the image forming apparatus. Using this function, a user performs a setting by operating an operation section, and preliminarily registers the setting as a program. Accordingly, the user is able to cause the image forming apparatus to execute a job by performing an operation for calling the program, without a need to perform an operation relating to that setting.

As an example, for a copying job, the user may perform a setting of two in one, a setting of a paper size of A4, a setting of duplex copying, and a setting of monochrome copying, by operating the operation section, and preliminarily register the settings as a program. By performing an operation for calling the program, the user is able to cause the image forming apparatus to execute the copying job in accordance with those settings.

If, in such an image forming apparatus, users are able to share the program, it is possible to reduce memory capacity necessary to store the program. Therefore, in a case where one user (e.g., a user A) intends to register a program having the same registration content as that of a program that has already been registered by another user (e.g., a user B), a terminal device of the user B is requested to permit sharing of the program with the user A. In some cases, the program is shared with the user A and used.

However, in the above-mentioned image forming apparatus, the degree of freedom of the user B has been restricted with respect to the availability of sharing of the program.

SUMMARY

An electronic device according to an aspect of the present disclosure includes an authentication section configured to authenticate a user of the electronic device, an operation section that serves as a unit for operating the electronic device and includes a display section, and a storage section configured to store programs that each cause the electronic device to perform a job in accordance with a preliminarily set content. A program is generated based on a setting performed in the operation section and an instruction to generate the program issued in the operation section after the user is authenticated in the authentication section. The electronic device further includes a program processing section configured to cause the storage section to store the generated program and associate the generated program with the user authenticated in the authentication section, and a display control section configured to cause the display section to display a selection screen for selecting, from among the programs stored in the storage section, the program associated with authenticated user. The electronic device further includes a job control section configured to read the program selected in the selection screen from the storage section and cause the electronic device to execute a job in accordance with a content of a setting indicated by the read program.

According to the aspect of the present disclosure, a user who permits to share a program is a first user and a user permitted to use a shared program is a second user. The electronic device includes a sharing processing section configured to perform processing in which the second user and the shared program are associated with each other. The second user is specified by the first user using the operation section after the first user is authenticated in the authentication section. When the second user is authenticated in the authentication section, the display control section causes the display section to display a screen indicating the shared program.

DETAILED DESCRIPTION

Hereinafter, an embodiment of the present disclosure will be described with reference to drawings. The present disclosure is not limited to this embodiment. In addition, purposes of an embodiment of the present disclosure, terms illustrated therein, and so forth are not limited to those described.

Figure 1:
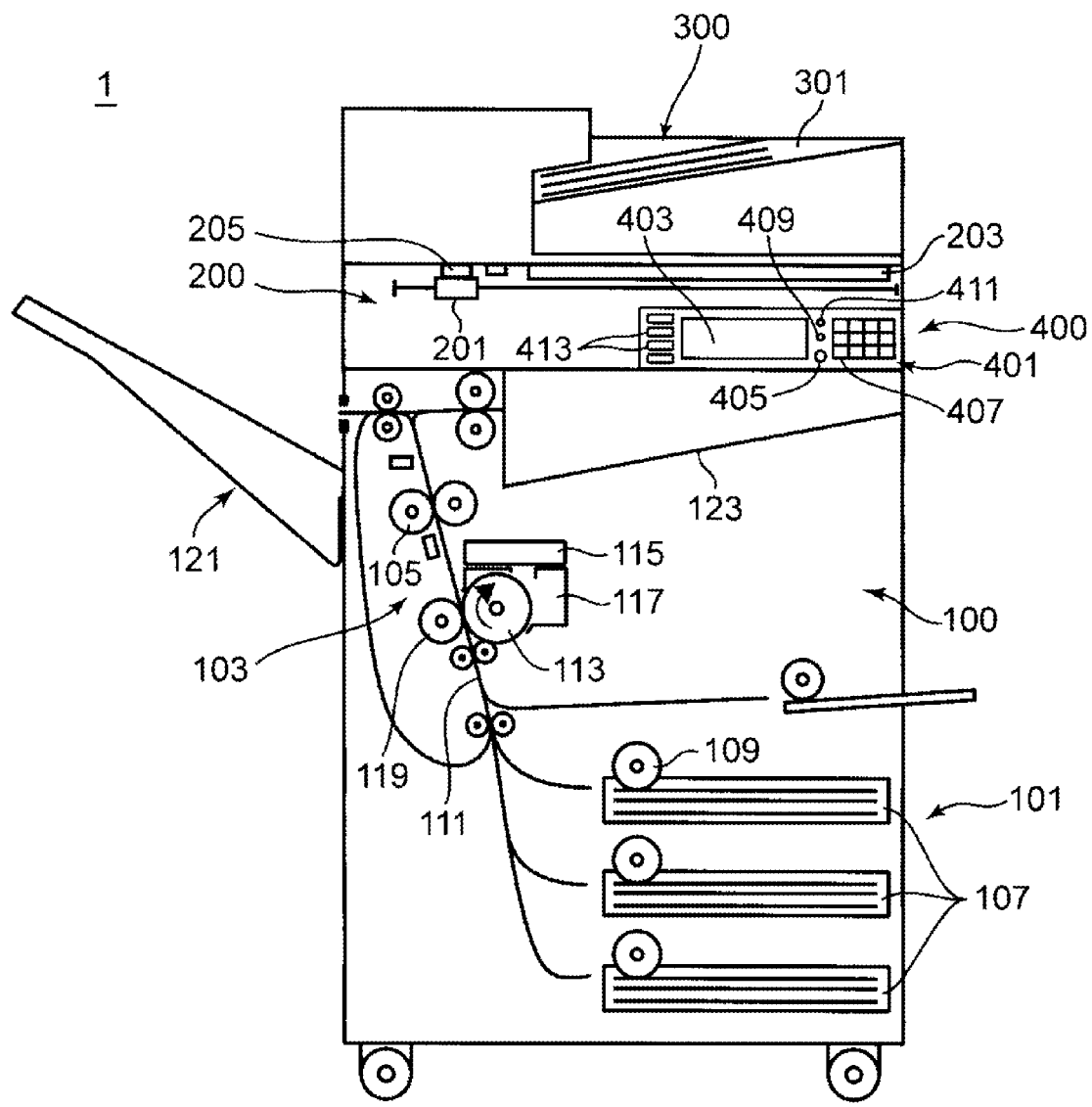
FIG. 1 is a pattern diagram illustrating an outline of an internal structure of an image forming apparatus according to an embodiment of the present disclosure.

FIG. 1 is a pattern diagram illustrating an outline of an internal structure of an image forming apparatus 1 according to an embodiment of the present disclosure. The image forming apparatus 1 is an example of an electronic device that can serve as a digital multifunction peripheral having functions of, for example, a copier, a printer, a scanner, and facsimile. The image forming apparatus 1 includes an apparatus main body 100, a document reading section 200 arranged above the apparatus main body 100, a document feeding section 300 arranged on the document reading section 200, and an operation section 400 arranged on a front surface of an upper portion of the apparatus main body 100.

The document feeding section 300 is an automatic document feeder, and it is possible to sequentially read a plurality of documents placed on a document placing section 301 by using the document reading section 200.

The document reading section 200 includes a carriage 201 equipped with an exposure lamp or the like, a platen 203 configured from a transparent member such as glass, a charge coupled device (CCD) sensor not illustrated, and a document reading slit 205. In a case where a document placed on the platen 203 is read, the document is read by the CCD sensor while the carriage 201 is moved in a longitudinal direction of the platen 203. On the other hand, in a case where a document fed from the document feeding section 300 is read, the carriage 201 is moved to a position facing the document reading slit 205, and the document sent from the document feeding section 300 is read by the CCD sensor through the document reading slit 205. The CCD sensor outputs the read document as image data.

The apparatus main body 100 includes a paper storage section 101, an image forming section 103, and a fixing section 105. The paper storage section 101 is arranged in the lowest portion of the apparatus main body 100, and includes paper trays 107 that are each capable of storing a stack of paper. In the stack of paper stored in one of the paper trays 107, a sheet of paper located in a top-most position is driven by a pickup roller 109, and is delivered to a paper transport path 111. The sheet of paper is transported to the image forming section 103 through the paper transport path 111.

The image forming section 103 forms a toner image on the transported sheet of paper. The image forming section 103 includes a photoreceptor drum 113, an exposure section 115, a developing section 117, and a transfer section 119. The exposure section 115 generates light modulated in accordance with image data (e.g., image data output from the document reading section 200, image data transmitted from a personal computer, image data of facsimile reception, or the like), and irradiates a uniformly-charged circumferential surface of the photoreceptor drum 113 with the light. As a result, an electrostatic latent image corresponding to the image data is formed in the circumferential surface of the photoreceptor drum 113. By supplying toner to the circumferential surface of the photoreceptor drum 113 in this state from the developing section 117, a toner image corresponding to the image data is formed in the circumferential surface. This toner image is then transferred, by the transfer section 119, to the above-mentioned sheet of paper that has been transported from the paper storage section 101.

The sheet of paper to which the toner image is transferred is sent to the fixing section 105. In the fixing section 105, heat and pressure are applied to the toner image and the sheet of paper, and the toner image is fixed in the sheet of paper. The sheet of paper is ejected to a stack tray 121 or a paper ejection tray 123.

The operation section 400 includes an operation key section 401 and a display section 403. The display section 403 has a touch panel function, and a screen including soft keys is displayed therein. By operating the soft keys while viewing the screen, a user performs a setting necessary to execute a function such as copying.

In the operation key section 401, operation keys including hard keys are provided. Specifically, a start key 405, a numerical keypad 407, a stop key 409, a reset key 411, function switching keys 413 for switching between a copier, a printer, a scanner, and a facsimile, and so forth are provided.

The start key 405 is a key for starting the operation of copying, facsimile transmission, or the like. The numerical keypad 407 is a key for inputting numeric characters such as a number of copies or a facsimile number. The stop key 409 is a key for stopping a copy operation or another operation that is ongoing. The reset key 411 is a key for restoring a set content to an initial setting state.

The function switching keys 413 include a copying key, a transmission key, and so forth, and are keys for alternately switching among a copying function, a transmission function, and so forth. If the copying key is operated, an initial screen for copying is displayed in the display section 403. If the transmission key is operated, an initial screen for facsimile transmission and mail transmission is displayed in the display section 403.

Figure 2:
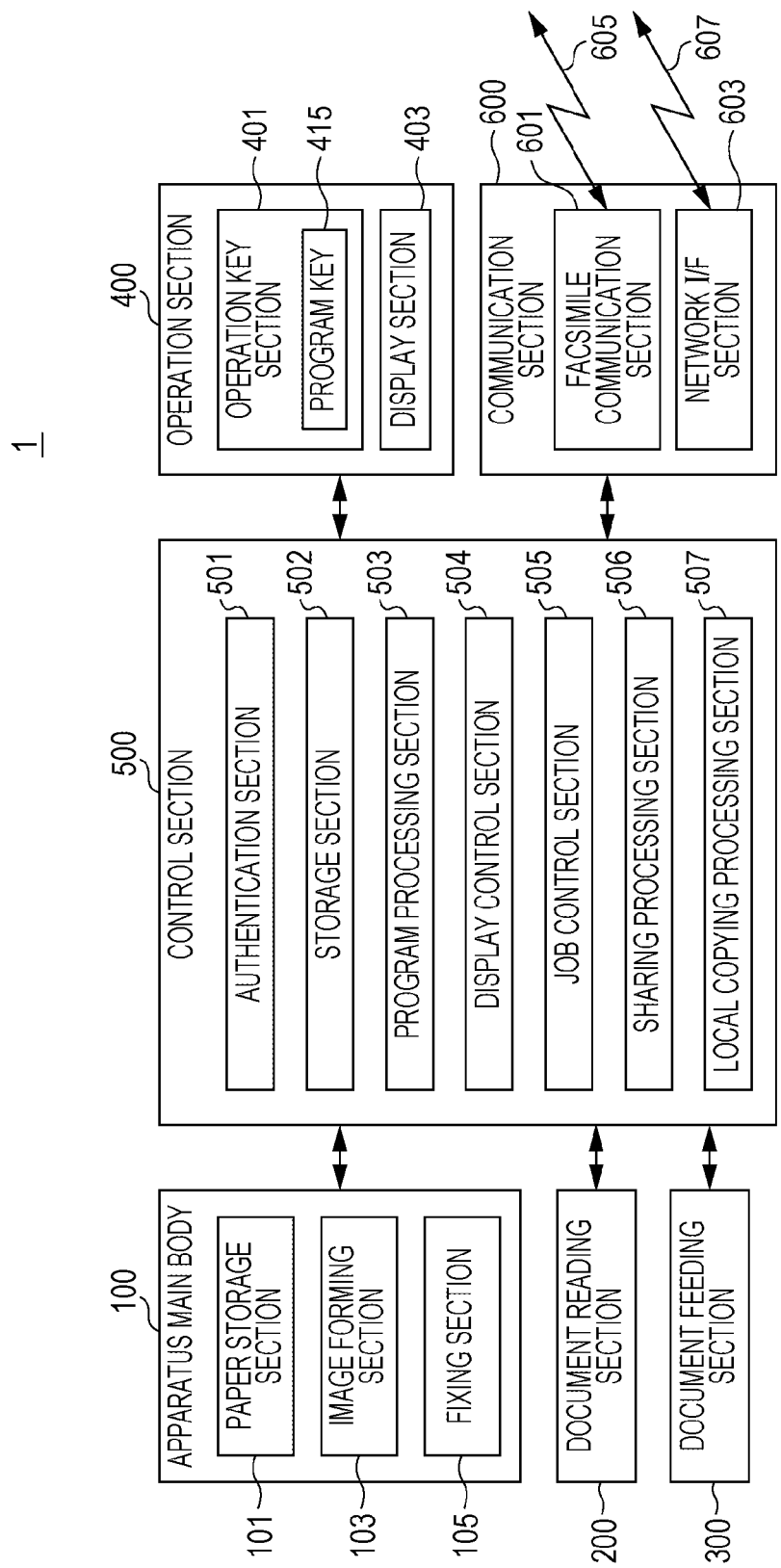
FIG. 2 is a block diagram illustrating one configuration of the image forming apparatus of FIG. 1.

FIG. 2 illustrates one configuration of the image forming apparatus 1 shown in FIG. 1. As illustrated, the image forming apparatus 1 includes the apparatus main body 100, the document reading section 200, the document feeding section 300, the operation section 400, a control section 500, and a communication section 600, all connected to one another through a bus.

Although not illustrated, the control section 500 includes a central processing unit (CPU), a read only memory (ROM), a random access memory (RAM), an image memory, and so forth. The CPU executes control necessary to cause the image forming apparatus 1 to operate on the above-mentioned configuration elements in the image forming apparatus 1, such as the apparatus main body 100. The ROM stores software necessary to control the operation of the image forming apparatus 1. The RAM is used for temporarily storing data that is generated at the time of execution of the software and storing application software. The image memory temporarily stores image data (e.g., image data output from the document reading section 200, image data transmitted from a personal computer, image data of facsimile reception, or the like).

As shown in FIG. 2, the control section 500 also includes functional blocks such as an authentication section 501, a storage section 502, a program processing section 503, a display control section 504, a job control section 505, a sharing processing section 506, and a local copying processing section 507.

The communication section 600 includes a facsimile communication section 601 and a network I/F section 603. The facsimile communication section 601 includes a network control unit (NCU) that controls a connection of a phone line with a facsimile on the other end, and controls a modulation and demodulation circuit that modulates and demodulates signals for facsimile communication. The facsimile communication section 601 is connected to a phone line 605.

The network I/F section 603 is connected to a local area network (LAN) 607. The network I/F section 603 is a communication interface circuit for executing communication with a terminal device connected to the LAN 607, such as a personal computer.

Using predetermined user authentication information, the authentication section 501 authenticates a user who utilizes the image forming apparatus 1. The predetermined user authentication information includes biological information of each user in the case of biometric authentication, information for identifying each user recorded in an ID card in the case of ID card authentication, or information of a password preliminarily set for each user in the case of password authentication.

The storage section 502 stores a program for causing the image forming apparatus 1 to execute a job in accordance with a preliminarily set content.

A number of setting values included in the program may be one, two, or more. The setting values may respectively correspond to, for example, a setting of two in one, a setting of a paper size of A4, a setting of duplex copying, and a setting of monochrome copying. The job executed in accordance with the content of a setting indicated by the program may be, for example, a job executed using one function, such as the copying function, or a job executed using a plurality of functions, such as a printer function and a staple function.

After a user is authenticated in the authentication section 501, the program processing section 503 is set using the operation section 400, generates a program based on an instruction for generating the program, and causes the storage section 502 to store the generated program while associating the generated program with the user authenticated in the authentication section 501.

In the display control section 504, an initial screen 10 (shown in FIG. 3 described later) displayed by the image forming apparatus 1. In a selection screen, after a user is authenticated in the authentication section 501, it is possible to select a program associated with the user, from among programs preliminarily stored in the storage section 502. In addition, a display control program is provided using a computer-readable recording medium such as a ROM, a hard disk, a flexible disk, a memory card, a magneto-optical disk, or the like. The display control program is read from the recording medium into the image forming apparatus, and instructions are sent to individual configuration sections in the image forming apparatus 1, causing the individual configuration sections to execute processing operations.

The job control section 505 reads, from the storage section 502, the program selected in the selection screen, and causes the image forming apparatus 1 to execute a job in accordance with the content of a setting indicated by the read program. In the case of, for example, a job of forming an image on a sheet of paper, the job control section 505 causes the apparatus main body 100 to execute the job of forming, on the sheet of paper, the image in accordance with image data.

The following description assumes that a user who permits to share a program is a first user and a user permitted to use a shared program is a second user. The shared program and the second user are specified using the operation section 400 after the first user is authenticated in the authentication section 501. Accordingly, the sharing processing section 506 performs processing for associating the second user with the shared program. If the second user is authenticated in the authentication section 501, the display control section 504 causes the display section 403 to display a screen indicating the shared program.

If a program key 415 in the operation section 400 is held down after a user is authenticated in the authentication section 501, the control section 500 shifts the image forming apparatus 1 into a program mode. The display control section 504 causes the display section 403 to display a screen corresponding to the program mode. The program mode includes a mode of calling a program, a mode of adding a program, a mode of editing a program, and a mode of deleting a program.

Figure 3:
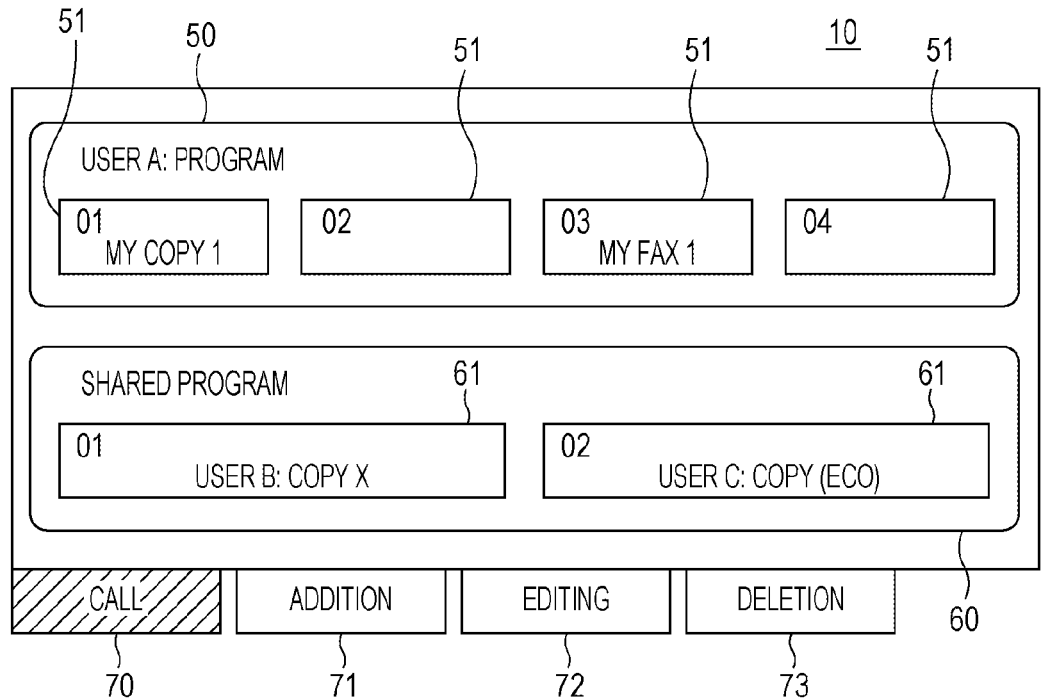
FIG. 3 is a configuration diagram of an initial screen in a mode of calling a program according to the embodiment.

FIG. 3 is a configuration diagram of the initial screen 10 in the mode of calling a program. With reference to FIG. 3, a configuration of the initial screen 10 in the mode of calling a program will be now described in more detail. The following example assumes that an ID of a user authenticated in the authentication section 501 is a "user A".

The initial screen 10 includes a program selection key area 50, a shared program selection key area 60, and various kinds of tabs 70 to 73. In the present embodiment, an example in which the program selection key area 50 has four program selection keys 51 will be described. However, the number of the program selection keys 51 is not limited to four. When it is difficult to cause all of the program selection keys 51 to be contained in the program selection key area 50, the display control section 504 may cause a scroll display of the program selection keys 51.

Respective programs are allocated to the program selection key 51 indicated by "01" and the program selection key 51 indicated by "03". A program for causing the image forming apparatus 1 to execute a copying job in accordance with, for example, a setting of two in one, a setting of a paper size of A4, a setting of duplex copying, and a setting of monochrome copying is allocated to the program selection key 51 indicated by "01". This program is a program that the user A causes the program processing section 503 to create.

In the program selection key 51 indicated by "01", a character image indicating "MY COPY 1" is synthesized. This is a name that the user A assigns to the program allocated to the program selection key 51 indicated by "01".

A program for causing the image forming apparatus 1 to execute a facsimile transmission job in accordance with, for example, a setting of a transmission time zone, a setting of a transmission destination of "06-1234-1***" or "03-1234 -*2", and a setting of color facsimile is allocated to the program selection key 51 indicated by "03". This program is a program that the user A causes the program processing section 503** to create.

In the program selection key 51 indicated by "03", a character image indicating "MY FAX 1" is synthesized. This is a name that the user A assigns to the program allocated to the program selection key 51 indicated by "03". No program is allocated to the program selection key 51 indicated by "02" and the program selection key 51 indicated by "04". Further, no character image indicating a program name is synthesized in these program selection keys 51.

In the present embodiment, an example in which the shared program selection key area 60 includes two shared program selection keys 61 is described. However a number of the shared program selection keys 61 is not limited to two. When it is difficult to cause all the shared program selection keys 61 to be contained in the shared program selection key area 60, the display control section 504 may cause a scroll display of the shared program selection keys 61.

Respective shared programs are allocated to the shared program selection key 61 indicated by "01" and the shared program selection key 61 indicated by "02". A program that a user B permits to share with the user A is allocated to the shared program selection key 61 indicated by "01". This program is a program that the user B causes the program processing section 503 to create. In the shared program selection key 61 indicated by "01", a character image indicating "USER B" and "COPY X" is synthesized. "COPY X" is a name that the user B assigns to the program.

A program that a user C permits to share with the user A is allocated to the shared program selection key 61 indicated by "02". This program is a program that the user C causes the program processing section 503 to create. In the shared program selection key 61 indicated by "02", a character image indicating "USER C" and "COPY (ECO)" is synthesized. "COPY (ECO)" is a name that the user C assigns to the program. If there is no program permitted to be shared with the user A, the shared program selection key area 60 does not include the shared program selection key 61.

The various kinds of tabs include a call tab 70, an addition tab 71, an editing tab 72, and a deletion tab 73. If a user selects the call tab 70, the display control section 504 (see FIG. 2) switches a screen displayed in the display section 403 (see FIG. 2) to the initial screen 10 in the mode of calling a program. In the same way, if the user selects the addition tab 71, the display control section 504 switches a screen displayed in the display section 403 to an initial screen 20 (see FIG. 4) in the mode of adding a program. If the user selects the editing tab 72, the display control section 504 switches a screen displayed in the display section 403 to an initial screen 31 (shown in FIG. 19 described later) in the mode of editing a program. If the user selects the deletion tab 73, the display control section 504 switches a screen displayed in the display section 403 to an initial screen 40 (shown in FIG. 25 described later) in the mode of deleting a program.

The program selection key 51 indicated by "01" will be used as an example to describe an execution of a job utilizing one of the program selection keys 51. With reference to FIG. 2 and FIG. 3, if the user A selects the program selection key 51 indicated by "01" in the initial screen 10 in the mode of calling a program, the job control section 505 reads, from the storage section 502, the program allocated to the program selection key 51 indicated by "01".

The display control section 504 switches a screen displayed in the display section 403 from the initial screen 10 to a screen indicating the content of a setting indicated by the program read by the job control section 505. Here, the screen is switched to a setting screen for copying. If the user A confirms the content of the setting while viewing the screen, and holds down the start key 405 (see FIG. 1), the job control section 505 causes the image forming apparatus 1 to execute a job in accordance with the setting indicated by the read program.

The shared program selection key 61 indicated by "01" will be used as an example to describe an execution of a job utilizing one of the shared program selection keys 61. With reference to FIG. 2 and FIG. 3, if the user A selects the shared program selection key 61 indicated by "01" in the initial screen 10 in the mode of calling a program, the job control section 505 reads, from the storage section 502, the program allocated to the shared program selection key 61 indicated by "01". A subsequent operation is the same as that in the above-described case of the program selection key 51 indicated by "01" being selected.

As described above, the display control section 504 causes the display section 403 to display the initial screen 10 serving as a selection screen that includes the program selection keys 51 and the shared program selection keys 61. When one of the program selection keys 51 to which a corresponding program is allocated is selected from among the program selection keys 51, the job control section 505 reads, from the storage section 502, the program allocated to the selected program selection key 51, and causes the image forming apparatus 1 to execute a job in accordance with the content of a setting indicated by the read program. On the other hand, when one of the shared program selection keys 61 is selected, the job control section 505 reads, from the storage section 502, a corresponding shared program allocated to the selected shared program selection key 61, and causes the image forming apparatus 1 to execute a job in accordance with the content of a setting indicated by the read shared program.

Figure 4:
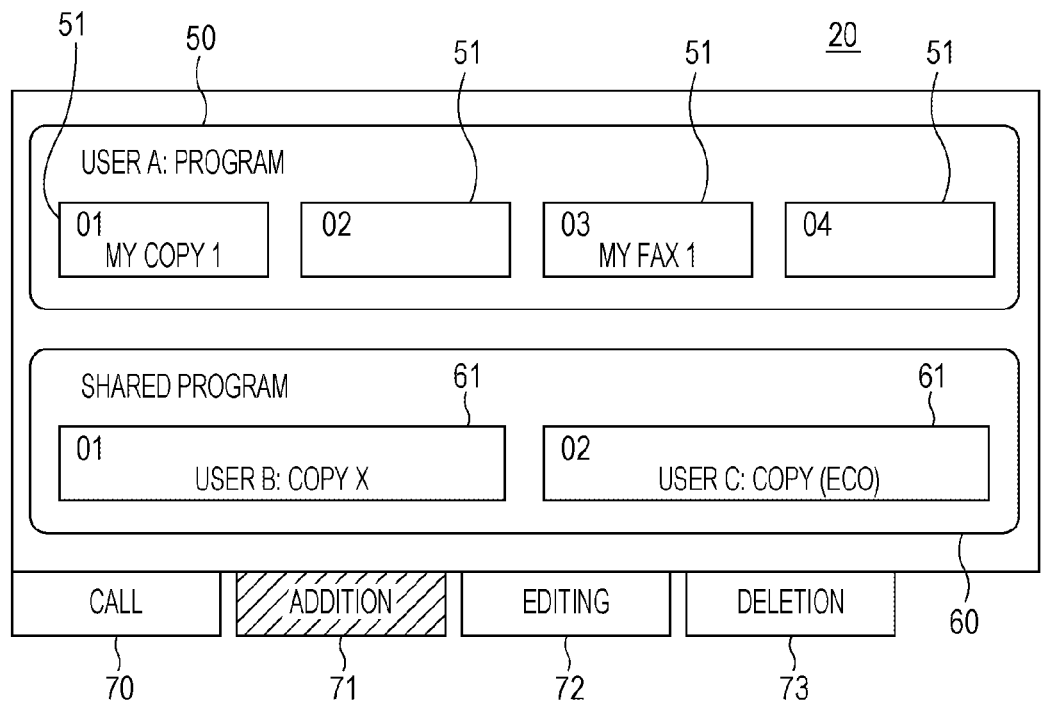
FIG. 4 is a configuration diagram of an initial screen in a mode of adding a program according to the embodiment.

With reference to FIG. 4, addition of a program will be described in more detail. FIG. 4 is a configuration diagram of an initial screen 20 in the mode of adding a program.

The initial screen 20 illustrated in FIG. 4 is different from the initial screen 10 in the mode of calling a program, as illustrated in FIG. 3, with respect to a highlighted display of a tab. While the call tab 70 is highlighted and displayed in the initial screen 10, the addition tab 71 is highlighted and displayed in the initial screen 20 illustrated in FIG. 4.

Various embodiments of the addition of a program may include an embodiment in which a program is newly created, an embodiment in which a shared program can be selected using one of the program selection keys 51, or an embodiment in which a program is overwritten.

The embodiment in which a program is newly created will be described first. With reference to FIG. 2 and FIG. 4, the user A holds down one of the program selection keys 51 to which no program is allocated. Here, it is assumed that the program selection key 51 indicated by "02" is held down.

Figure 5:
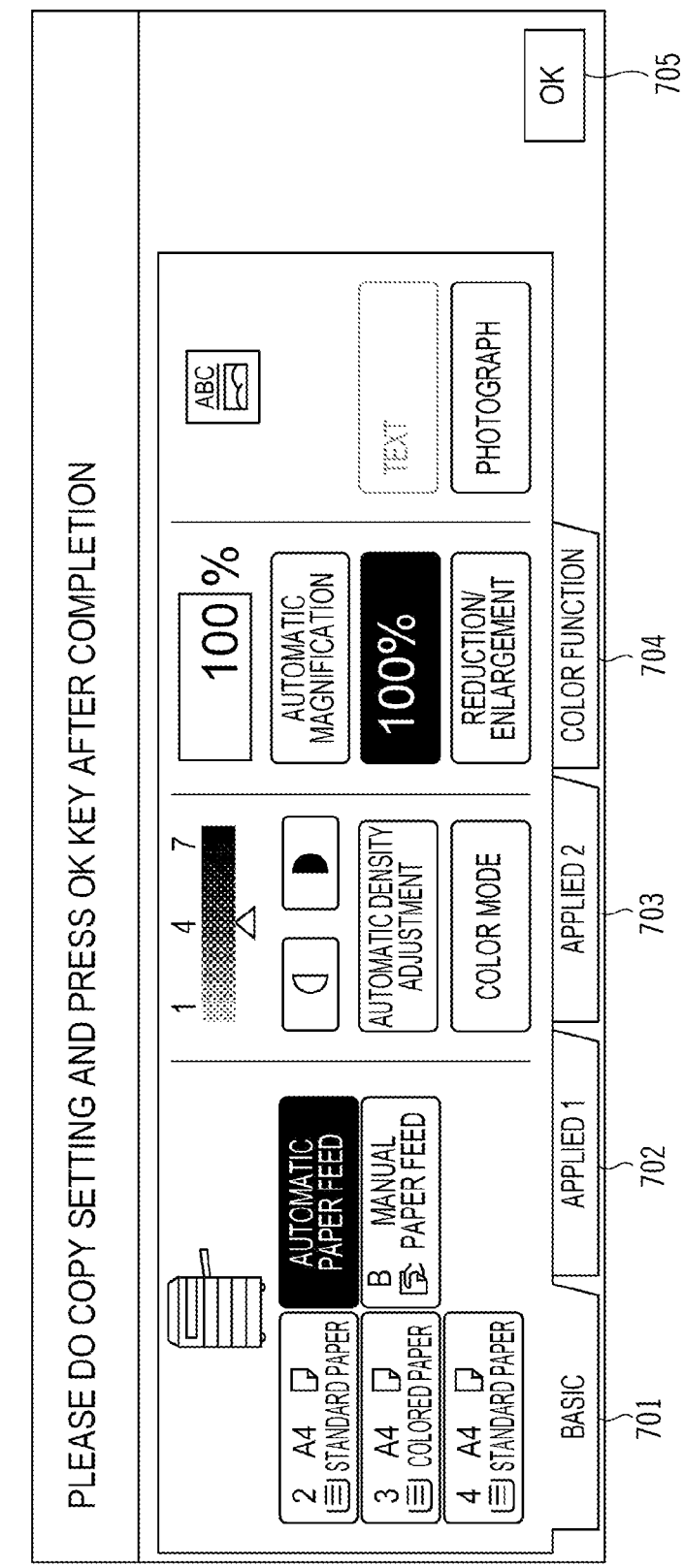
FIG. 5 is a configuration diagram of a setting screen for copying according to the embodiment.

If the program selection key 51 indicated by "02" is held down, the display control section 504 causes the display section 403 to display a setting screen for a function set by default. Here, the copying function is set as a default. Accordingly, the display control section 504 causes the display section 403 to display a setting screen 700 for copying, as illustrated in FIG. 5. The setting screen 700 includes various kinds of tabs 701 to 704.

If the tab 701 is held down, the display control section 504 causes the display section 403 to display the setting screen 700 for performing a basic setting for copying. If the tab 702 is held down, the display control section 504 causes the display section 403 to display the setting screen 700 for performing a first applied setting for copying. If the tab 703 is held down, the display control section 504 causes the display section 403 to display the setting screen 700 for performing a second applied setting for copying. Since a number of kinds of applied settings is large, the applied settings are classified into the tab 702 and the tab 703. If the tab 704 is held down, the display control section 504 causes the display section 403 to display the setting screen 700 for performing a detailed setting for a color function.

Figure 6:
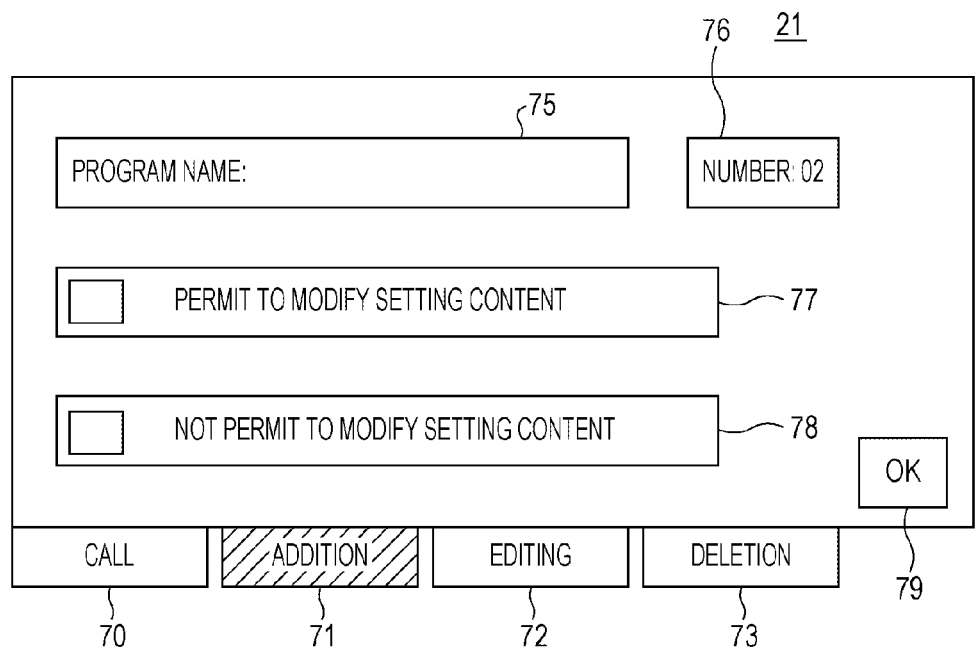
FIG. 6 is a configuration diagram of a screen in the mode of adding a program according to the embodiment.

Referring back to FIG. 5, a state in which the tab 701 is held down and the setting screen 700 for performing a basic setting for copying is displayed will be described in more detail. If the user A performs a desired setting by performing a touch operation on the setting screen 700 (using the operation section 400) and holds down an OK key 705 included in the setting screen 700, the display control section 504 switches a screen displayed in the display section 403 from the setting screen 700 illustrated in FIG. 5 to a screen 21 in the mode of adding a program, as illustrated in FIG. 6.

The screen 21 includes various kinds of tabs 70 to 73, an entry field 75, a key number 76, setting keys 77 and 78, and an OK key 79.

The entry field 75 is a field to which a name to be assigned to a newly created program is input using the operation section 400. The key number 76 is a number of one of the program selection keys 51 to which the new program is to be allocated. Since, as described above, the user A holds down the program selection key 51 indicated by "02", the key number 76 is a character image of "NUMBER: 02".

Figure 7:
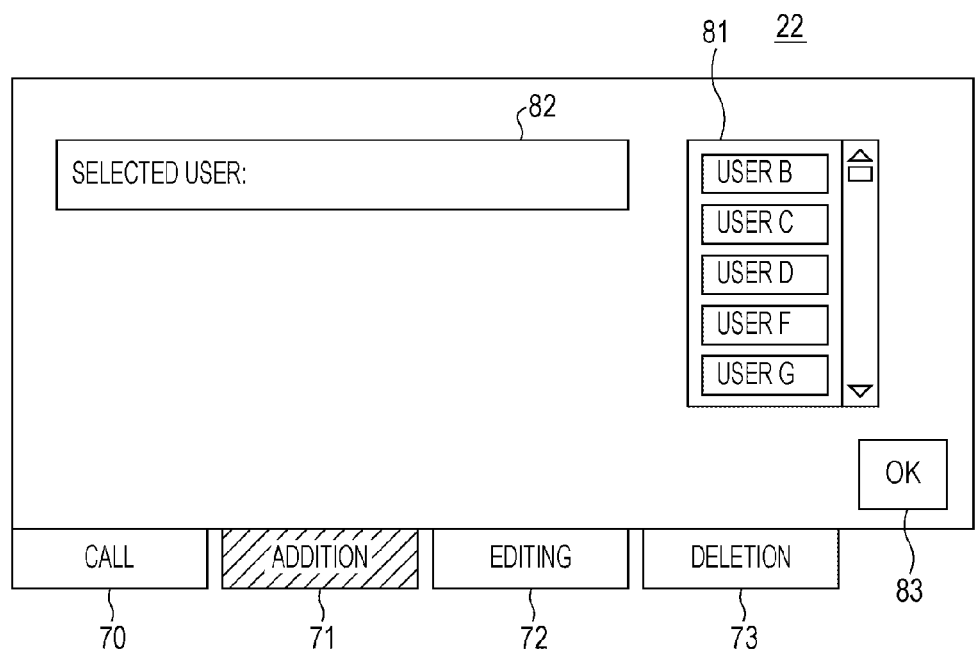
FIG. 7 is a configuration diagram of another screen in the mode of adding a program according to the embodiment.

The setting key 77 is a key for setting a user to whom authority to modify the content of a setting indicated by a program is to be assigned, from among users with whom the program is shared. As an example, assume a program that causes the image forming apparatus 1 to execute a copying job in accordance with, for example, settings of two in one, a paper size of A4, duplex copying, and monochrome copying. To modify the content of a setting of a program is to change, for example, the setting of two in one to the setting of four in one. If the setting key 77 is held down, the display control section 504 switches a screen displayed in the display section 403 from the screen 21 to a screen 22 illustrated in FIG. 7.

The screen 22 includes the various kinds of tabs 70 to 73, a user selection field 81, a user display field 82, and an OK key 83.

In the user selection field 81, user IDs indicating names of all users authenticated in the authentication section 501 are scroll-displayed. If the user A performs an operation for selecting, for example, the user B and the user C as users to which authority to modify a setting content is to be assigned, from among users with whom the program is shared, the display control section 504 causes the user display field 82 to display "USER B" and "USER C" as the user IDs.

If the OK key 83 is held down, the sharing processing section 506 confirms the users to which authority to modify the setting content has been assigned. In addition, the display control section 504 switches a screen displayed in the display section 403 from the screen 22 to a screen 23 illustrated in FIG. 8. The screen 23 has the same configuration as that of the screen 21 illustrated in FIG. 6. In the screen 23, a check is displayed in a check field 84 of the setting key 77. This check indicates that a user with an assigned authority to modify the setting content is selected.

Figure 8:
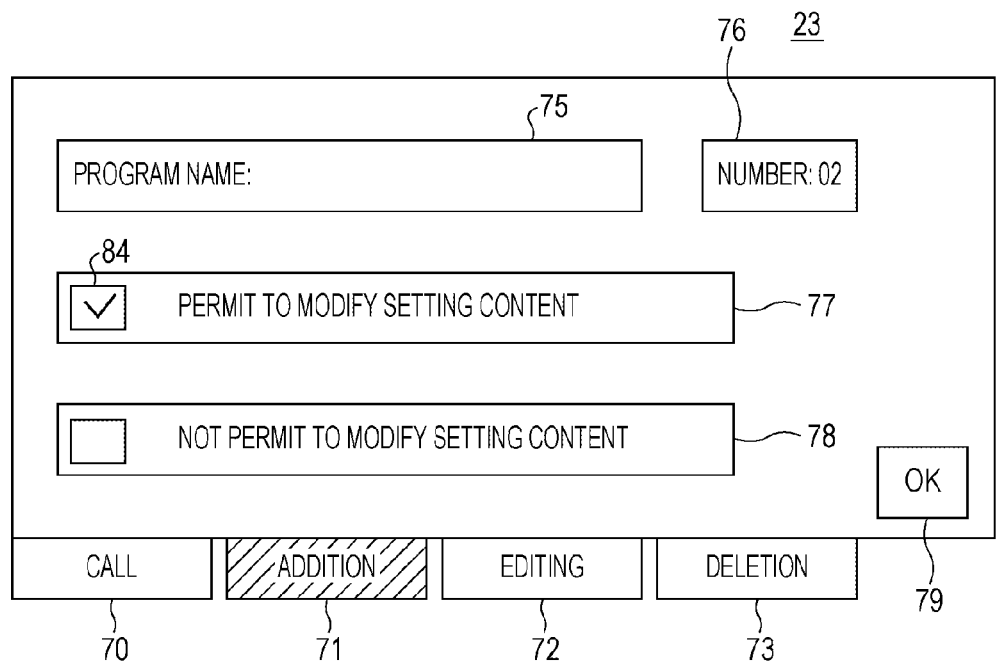
FIG. 8 is a configuration diagram of a screen in the mode of adding a program similar to the screen of FIG. 6.

With reference to FIG. 8, the setting key 78 is a key for setting a user to whom no authority to modify the setting content is to be assigned, from among users with whom the program is shared. If the setting key 78 is held down, the display control section 504 switches a screen displayed in the display section 403 from the screen 23 to the screen 22 already described and illustrated in FIG. 7.

If, using the user selection field 81, the user A performs an operation for selecting, for example, a user F as a user to which no authority to modify the setting content is to be assigned, from among users with whom the program is shared, the display control section 504 causes the user display field 82 to display "USER F".

If the OK key 83 is held down, the sharing processing section 506 confirms the user to whom no authority to modify the setting content has been assigned. In addition, the display control section 504 switches a screen displayed in the display section 403 from the screen 22 to a screen 24 illustrated in FIG. 9. The screen 24 has the same configuration as that of the screen 21 illustrated in FIG. 6. In the screen 24, a check is displayed in a check field 85 of the setting key 78. This check indicates that a user with no assigned authority to modify the setting content is selected.

As described above, after the user A serving as the first user is authenticated in the authentication section 501, when an input for assigning authority to the second user to modify the content of a setting indicated by a shared program is performed using the operation section 400, the sharing processing section 506 is able to perform a registration for assigning the authority to the second user. In addition, when an input for not assigning the authority to the second user is performed, the sharing processing section 506 is able to perform a registration for not assigning the authority to the second user.

Figure 9:
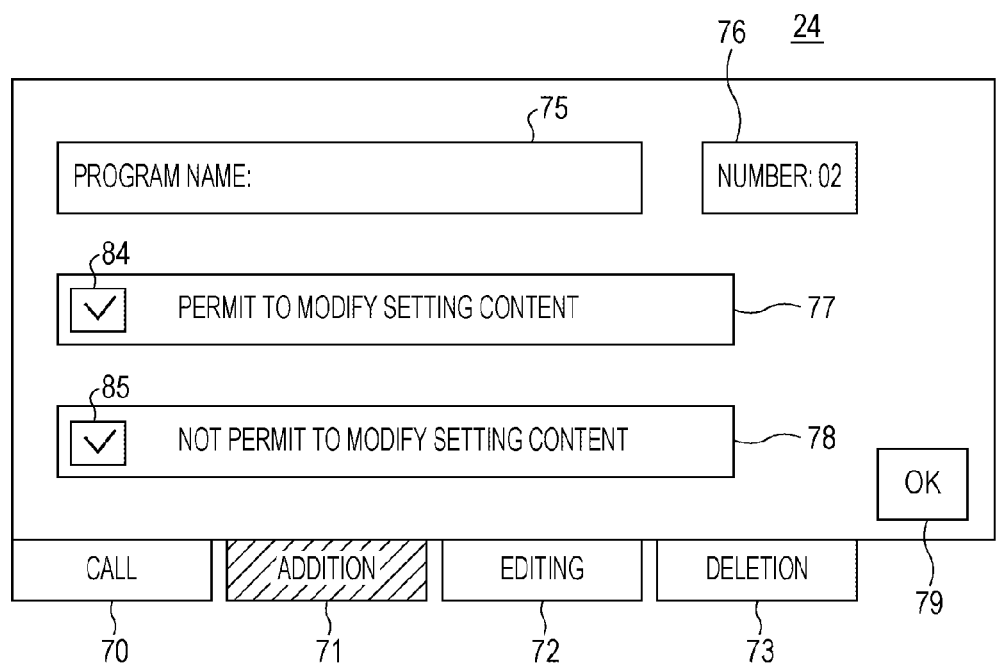
FIG. 9 is a configuration diagram of a screen in the mode of adding a program similar to the screen of FIG. 6.

Referring to FIG. 9, if the user A inputs the program name using the operation section 400, the display control section 504 is able to display the name in the entry field 75. Here, as the name of the program, for example, "MY COPY 2" is input.

Figure 10:
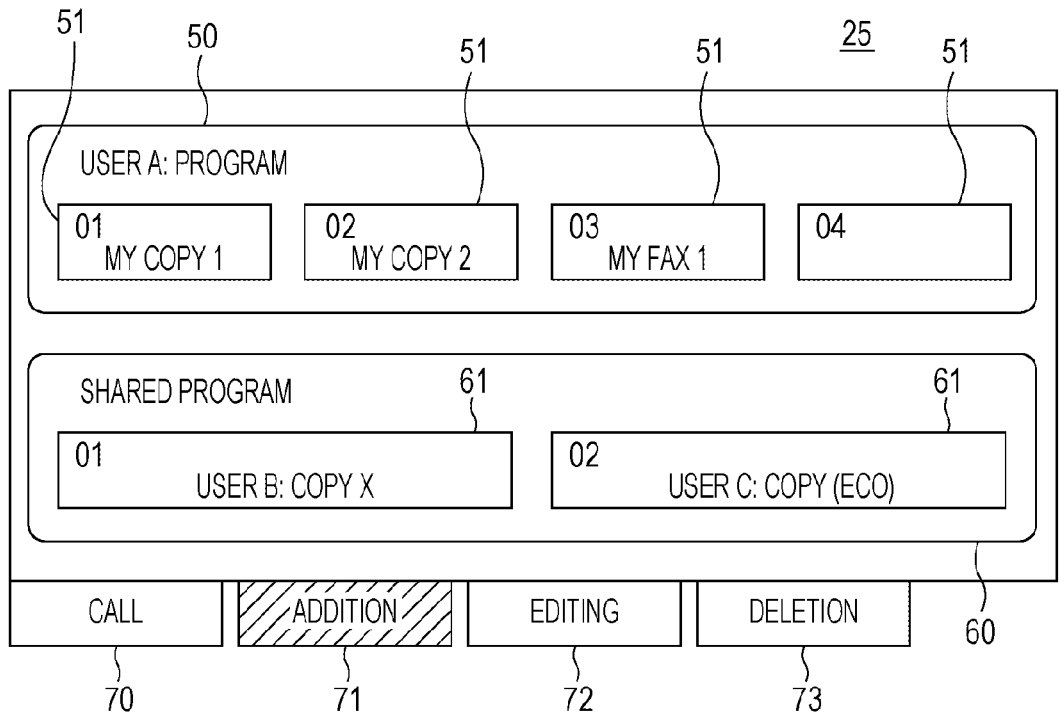
FIG. 10 is a configuration diagram of the initial screen in the mode of adding a program according to the embodiment.

If the OK key 79 is held down, the display control section 504 switches a screen displayed in the display section 403 from the screen 24 to an initial screen 25 in the mode of adding a program, as illustrated in FIG. 10. The initial screen 25 has the same configuration as that of the initial screen 20 illustrated in FIG. 4. Since, in the initial screen 25, the newly created program is allocated to the program selection key 51 indicated by "02", the display control section 504 causes a character image indicating "MY COPY 2," which serves as the name of the newly created program, to be synthesized and displayed in the program selection key 51 indicated by "02".

As the addition of a program, the embodiment in which a shared program is selected using one of the program selection keys 51 and local copying processing is performed will be described. As described above with reference to FIG. 3, if, in the mode of calling a program, the shared program selection key 61 indicated by, for example, "01" is held down, the shared program allocated to that shared program selection key 61 indicated by "01" is read from the storage section 502 and the image forming apparatus 1 executes a job in accordance with the content of a setting indicated by the shared program.

The name of the program allocated to the shared program selection key 61 indicated by "01" is a name that the user B assigns. Accordingly, in some cases, it is difficult for the user A to understand the program allocated to that key. In those cases, the user A may desire to assign a unique name (or a new name). In the present embodiment, the user A is able to uniquely assign a name to a program permitted to be shared with the user A.

Referring to FIG. 2 and FIG. 4, assume that, in the mode of adding a program, the user A holds down, for example, the shared program selection key 61 indicated by "01" that is assigned to a shared program. Depending on whether or not authority to modify the shared program allocated to that shared program selection key 61 is assigned to the user A, processing is different. In the case where the authority to modify the shared program is assigned to the user A, the display control section 504 switches a screen displayed in the display section 403 from the initial screen 20 to a screen 26 illustrated in FIG. 11.

The screen 26 includes the various kinds of tabs 70 to 73, a creator field 86, a name field 87, a key number 88, a local copying key 89, and a modification history field 90.

In the creator field 86, a user ID indicating a name of a user who created a shared program is displayed. Here, as the user ID, "USER B" is displayed. In the name field 87, a name assigned to the shared program is displayed. Here, as the name, "COPY X" is displayed. "COPY X" is a name assigned to the shared program by the user B.

The local copying key 89 is a key for inputting an instruction for processing, namely, the local copying processing, to allocate a shared program to one of the program selection keys 51.

In the modification history field 90, a name of a user who recently modified the shared program and date and time of the modification are displayed. Here, the modification history field 90 displays that the user A modified the shared program at 13:59 on Mar. 7, 2014. The user B who is the creator of the shared program is able to modify the shared program. Since the authority to modify the shared program is assigned to the user A, the user A is able to modify the shared program.

Figure 11:
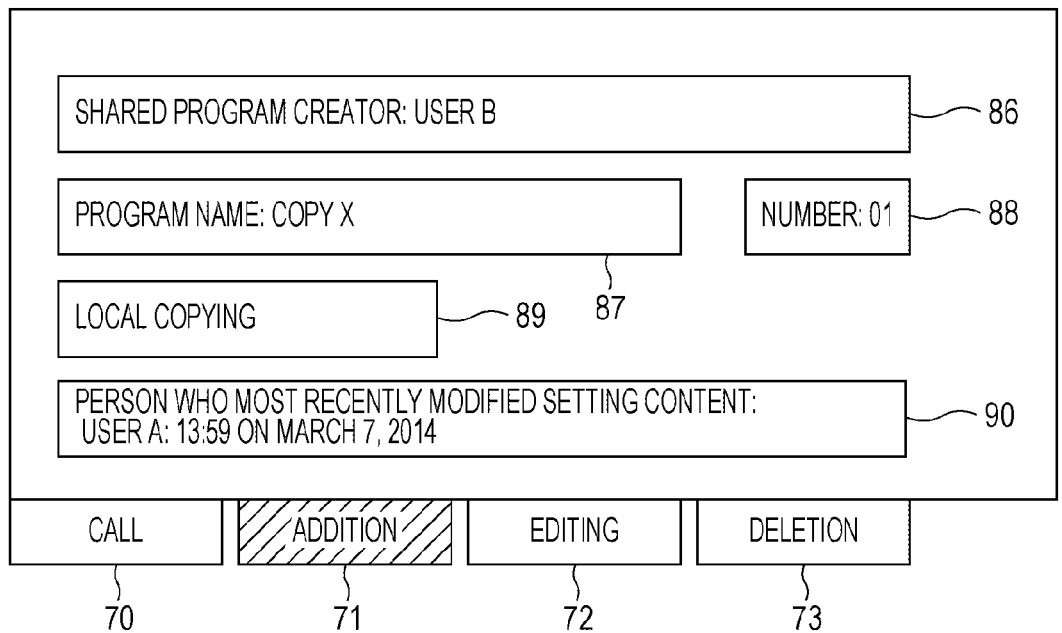
FIG. 11 is a configuration diagram of another screen in the mode of adding a program according to the embodiment.
Figure 12:
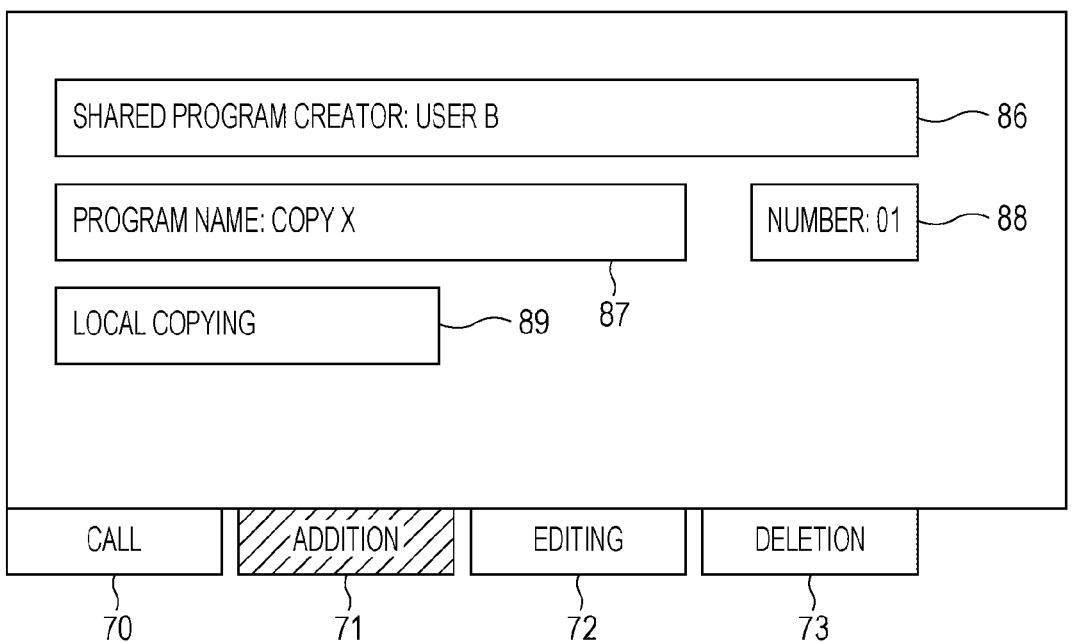
FIG. 12 is a configuration diagram of a variation of the screen of FIG. 11.

On the other hand, in the case where no authority to modify the shared program is assigned to the user A, the display control section 504 switches a screen displayed in the display section 403 from the screen 20 illustrated in FIG. 4 to a screen 27 illustrated in FIG. 12. The screen 27 is different from the screen 26 illustrated in FIG. 11 in that there is no modification history field 90.

Figure 13:
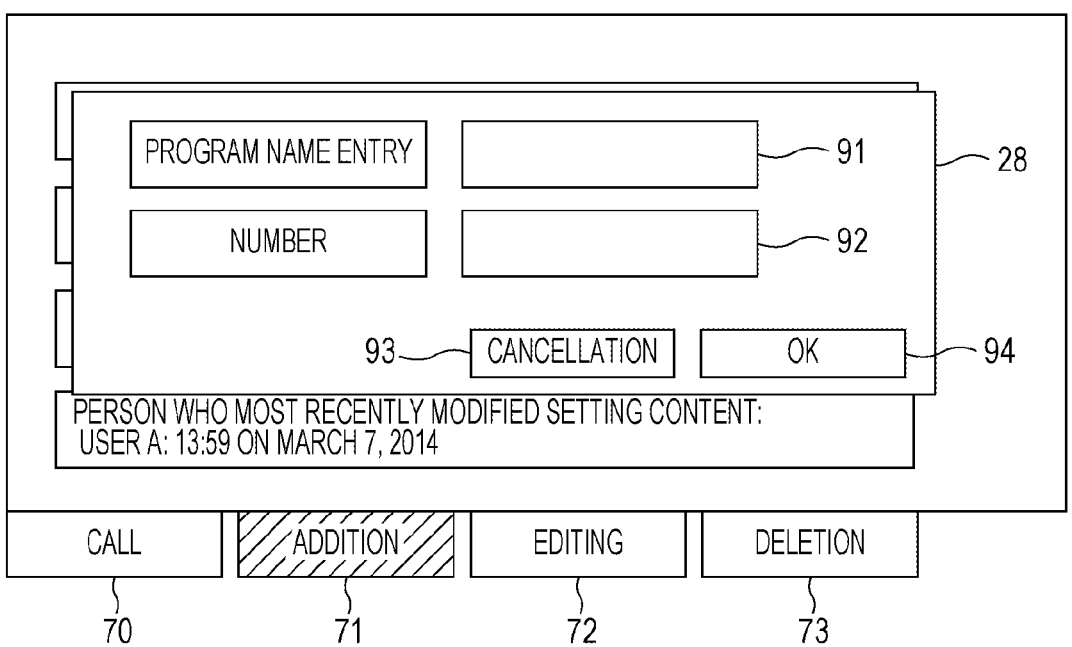
FIG. 13 is a configuration diagram of a screen superimposed on the screen of FIG. 11.
Figure 14:
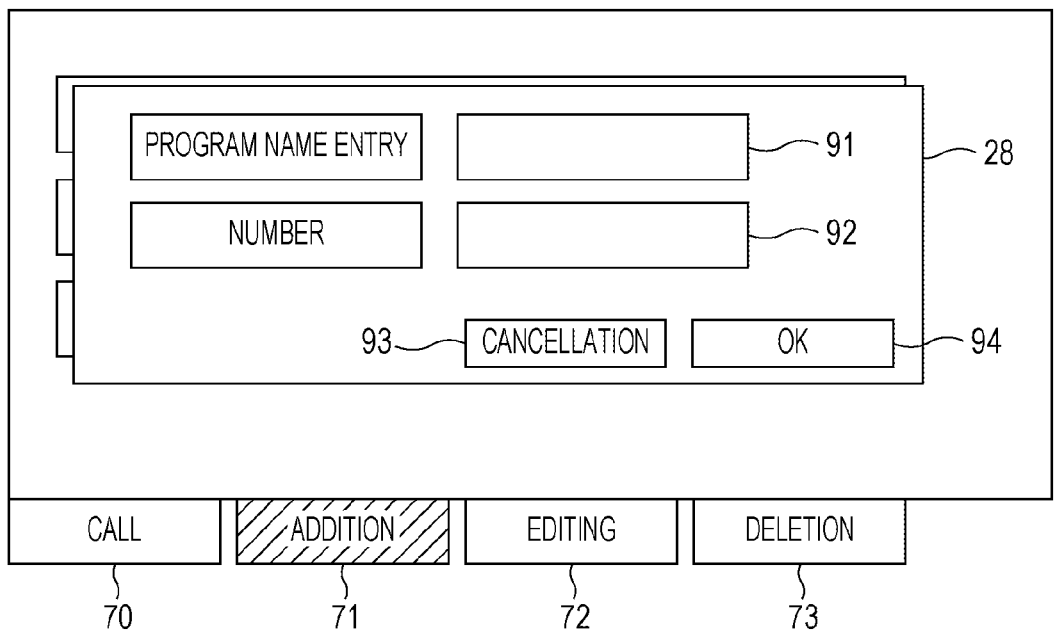
FIG. 14 is a configuration diagram of a screen superimposed on the screen of FIG. 12.

With reference to FIG. 11, if the user A holds down the local copying key 89, the display control section 504 causes a screen 28 to be superimposed and displayed on the screen 26 displayed in the display section 403, as illustrated in FIG. 13. On the other hand, with reference to FIG. 12, if the user A holds down the local copying key 89, the display control section 504 causes the screen 28 to be superimposed and displayed on the screen 27 displayed in the display section 403, as illustrated in FIG. 14. Since, a subsequent processing is the same in both the screen 28 illustrated in FIG. 13 and the screen 28 illustrated in FIG. 14, the screen 28 will be used as an example and described in more detail.

The screen 28 includes a name entry field 91, a number entry field 92, a cancellation key 93, and an OK key 94.

The name entry field 91 is a field in which a name that the user A uniquely assigns to the shared program allocated to the shared program selection key 61 indicated by "01" is input using the operation section 400. Here, it is assumed that "MY COPY 3" is input.

The number entry field 92 is a field in which a number of one of the program selection keys 51 to which the shared program is to be allocated is input using the operation section 400. Here, it is assumed that "02" serving as the number of the program selection key 51 indicated by "02" in FIG. 4 is input.

If the cancellation key 93 is held down, the display control section 504 performs processing for erasing the screen 28 from the display section 403. As a result, the display control section 504 causes the screen 26 illustrated in FIG. 11 to be displayed in the display section 403.

Figure 15:
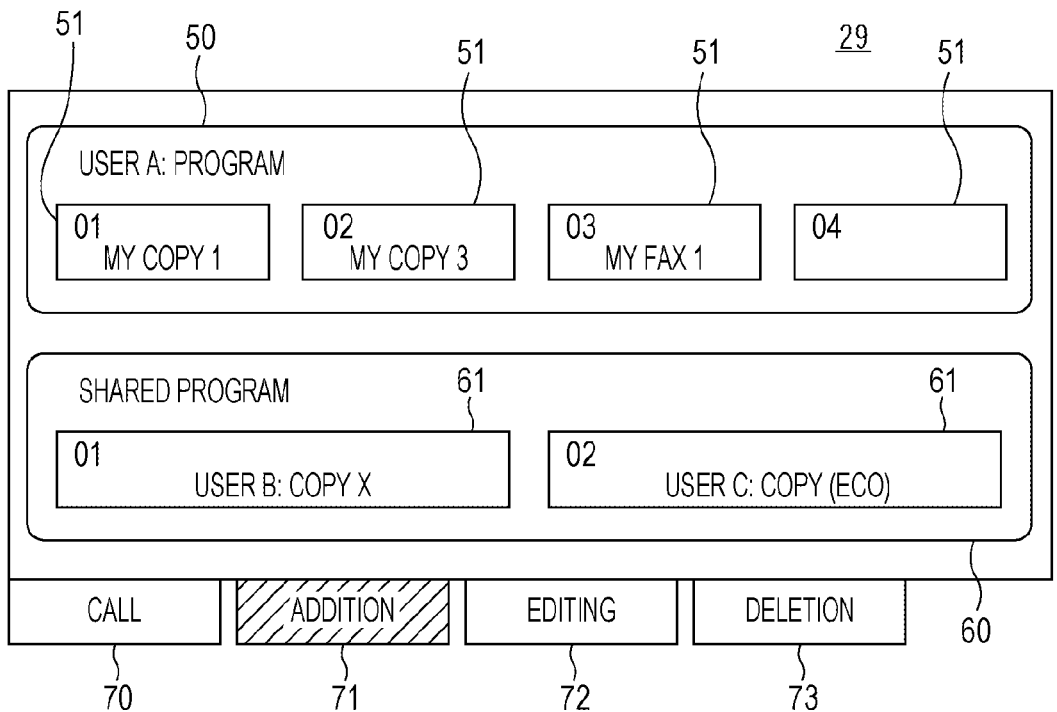
FIG. 15 is a configuration diagram of the initial screen in the mode of adding a program according to the embodiment.

If the OK key 94 is held down, the local copying processing section 507 confirms the name of the program and the number of the program selection key 51. The display control section 504 switches a screen displayed in the display section 403 from the screen 26 illustrated in FIG. 13 to an initial screen 29 in the mode of adding a program, as illustrated in FIG. 15.

The initial screen 29 has the same configuration as that of the initial screen 20 in the mode of adding a program, as illustrated in FIG. 4. Since a predetermined input described with reference to FIG. 13 is performed, the character image "MY COPY 3" is synthesized in the program selection key 51 indicated by "02". From the above, the local copying processing is completed.

Figure 16:
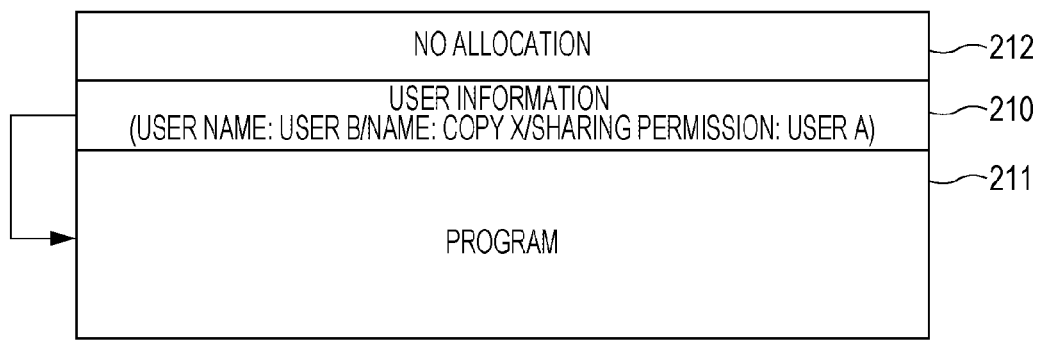
FIG. 16 is a block diagram illustrating a portion of a storage section before local copying processing, according to the embodiment.

With reference to FIG. 16, a portion of the storage section 502 (see FIG. 2) before the local copying processing will be described. FIG. 16 is a block diagram illustrating the portion of the storage section 502 (see FIG. 2) before the local copying processing.

In a storage area 210 of the storage section 502, user information is stored. The user information includes a name of a user who creates a program and a name assigned to the program. In addition, when the program is shared with another user, the user information further includes a name of the user with whom the program is shared. These user names are user IDs of users authenticated in the authentication section 501. In a storage area 211 of the storage section 502, the program associated with the user information stored in the storage area 210 is stored. In this way, at the time of storing a created program in the storage section 502, the program processing section 503 causes the user information and the program to be stored in the storage section 502 and associated with each other.

Since, in the example shown in FIG. 16, the program stored in the storage area 211 is permitted to be shared with another user (i.e., the user A), it is a shared program. As illustrated in FIG. 16, a storage area 212 in the storage section 502 is not in use.

The display control section 504 references the user information. In addition, since the user A is permitted to use the shared program, the display control section 504 performs processing for causing the shared program selection key 61 indicated by "01" to be included in the initial screen 10 illustrated in FIG. 3, the initial screen 20 illustrated in FIG. 4, the initial screen 25 illustrated in FIG. 10, the initial screen 29 illustrated in FIG. 15, and an initial screen 31 illustrated in FIG. 19 (to be described later). If the user A holds down the call tab 70 and selects the shared program selection key 61 indicated by "01", the job control section 505 reads the program (shared program) stored in the storage area 211 shown in FIG. 16, and causes the image forming apparatus 1 to execute a job in accordance with the content of a setting indicated by the read program.

Figure 17:
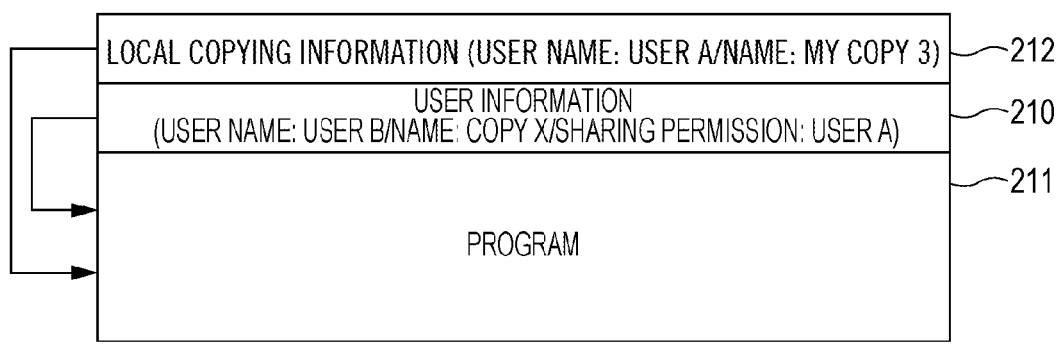
FIG. 17 is a block diagram illustrating a portion of the storage section after the local copying processing, according to the embodiment.

With reference to FIG. 17, a portion of the storage section 502 (see FIG. 2) after the local copying processing will be described. FIG. 17 is a block diagram illustrating the portion of the storage section 502 after the local copying processing. The block diagram in FIG. 17 is different from the block diagram in FIG. 16 in that local copying information is stored in the storage area 212. The local copying information stores the user name "USER A" serving as a name of a user who performs local copying, and the name "MY COPY 3" assigned to the program by the user who performs local copying. The user name is the user ID of the user authenticated in the authentication section 501 (in this case, the user A). The local copying processing section 507 causes the local copying information that includes the user ID of the user A serving as the second user and the "MY COPY 3" serving as the name assigned by the second user to the shared program to be stored in the storage section 502 and associated with each other.

At the time of displaying the initial screen 29 after the local copying processing illustrated in FIG. 15, the display control section 504 references the user information stored in the storage area 210, and further references the local copying information stored in the storage area 212. By referencing the local copying information, the display control section 504 performs processing for causing the program selection key 51 indicated by "02" to be included in the initial screen 29. As a result, if the user A holds down the call tab 70 and selects the program selection key 51 indicated by "02", the job control section 505 reads the shared program stored in the storage area 211 shown in FIG. 17, and causes the image forming apparatus 1 to execute a copying job in accordance with the content of a setting indicated by the read program.

The local copying processing will be now described in more detail. In the present embodiment, it is assumed that processing for allocating one of the program selection keys 51 to a shared program and assigning a name to the shared program is referred to as the local copying processing. However, in other embodiments, the local copy processing may only include processing for allocating one of the program selection keys 51 to the shared program. In the present embodiment, after the user A serving as the second user is authenticated in the authentication section 501, a shared program is specified, one of the program selection keys 51 is specified, and a name of the shared program is input, using the operation section 400. Accordingly, the local copying processing section 507 executes the local copying processing.

The display control section 504 causes the display section 403 to display the initial screen 29 illustrated in FIG. 15, in which an image indicating the input name is associated with the program selection key 51 to which the shared program is allocated. With reference to FIG. 15, a character image indicating the input name "MY COPY 3" is synthesized in the program selection key 51 indicated by "02". The reason is that the image indicating the input name is associated with the program selection key 51 to which the shared program is allocated.

When the program selection key 51 to which the shared program is allocated is selected, the job control section 505 reads the shared program from the storage section 502 (namely, the storage area 211 shown in FIG. 17), and causes the image forming apparatus 1 to execute a job in accordance with the content of a setting indicated by the shared program.

As described above, according to the local copying processing, it is possible for the user A serving as the second user to uniquely assign a new name to the shared program permitted to be shared with the user A. Further, it is possible to select, from among the program selection keys 51, one of the program selection keys 51 to which the shared program is to be allocated.

Figure 18:
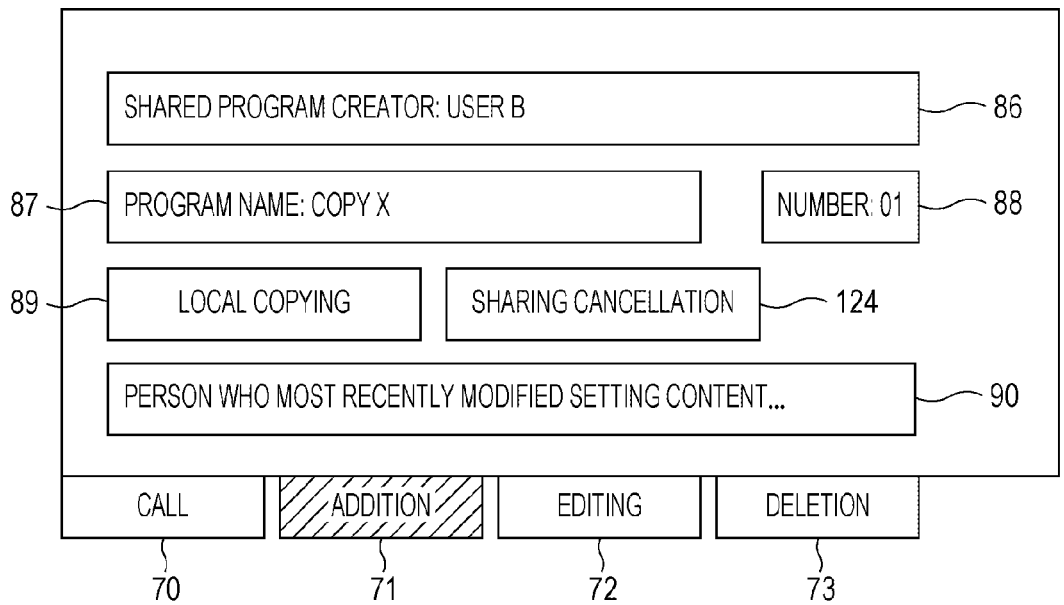
FIG. 18 is a configuration diagram of another screen in the mode of adding a program according to the embodiment.

A user permitted to use a shared program may reject sharing and uniquely register a new program. Referring back to FIG. 4, the case where, in the mode of adding a program, the user A holds down, for example, the shared program selection key 61 indicated by "01" will be described. The display control section 504 switches a screen displayed in the display section 403 from the initial screen 20 to a screen 30 illustrated in FIG. 18. The screen 30 is different from the screen 26 illustrated in FIG. 11 in that a sharing cancellation key 124 is added. The case where an authority to modify the shared program allocated to the shared program selection key 61 indicated by "01" is assigned to the user A will be described. When the authority to modify the shared program is not assigned, the screen 30 does not include the modification history field 90.

If the user A holds down the sharing cancellation key 124, the display control section 504 switches a screen displayed in the display section 403 from the screen 30 to a confirmation screen (not illustrated). The confirmation screen includes a key causing the user A to select whether or not to register, as a program of the user A, the same program as the program permitted to be shared with the user A.

If a key for not registering the program as a program of the user A is held down, the display control section 504 switches a screen displayed in the display section 403 from the confirmation screen to a usual copy screen.

If a key for registering the program as a program of the user A is held down, the display control section 504 causes the screen 28 illustrated in FIG. 13 to be superimposed and displayed on the confirmation screen. Using the operation section 400, the user A inputs, in the name entry field 91, a new name to be assigned to a program, and inputs, in the number entry field 92, a number of one of the program selection keys 51 to be allocated to the program. If the OK key 94 is held down, the program processing section 503 causes the storage section 502 to store the program while associating the program with the user A. In addition, in a case where the user A does not modify the program permitted to be shared with the user A, the program processing section 503 may cause the storage section 502 not to store that program and not to register the program while associating the program with programs permitted to be shared with the user A.

As the addition of a program, the embodiment in which a program is overwritten will be described. Referring back to FIG. 2 and FIG. 4, in the mode of adding a program, the user A holds down one of the program selection keys 51 to which a program is allocated. It is assumed that the program selection key 51 indicated by, for example, "01" is held down.

If the program selection key 51 indicated by "01" is held down, the display control section 504 reads, from the storage section 502, a setting indicated by the program allocated to this program selection key 51, and causes the display section 403 to display, for example, the setting screen 700 illustrated in FIG. 5, as a setting screen in which this setting is reflected. In addition, if a setting desired to be modified is modified using the operation section 400 and the OK key 705 is held down, the display control section 504 causes the display section 403 to display a screen capable of modifying the name of the program. When the name of the program is to be modified, a new name of the program is input using the operation section 400, and an OK key in that screen is held down. From this, the program processing section 503 performs processing for overwriting the program allocated to the program selection key 51 indicated by "01".

Figure 19:
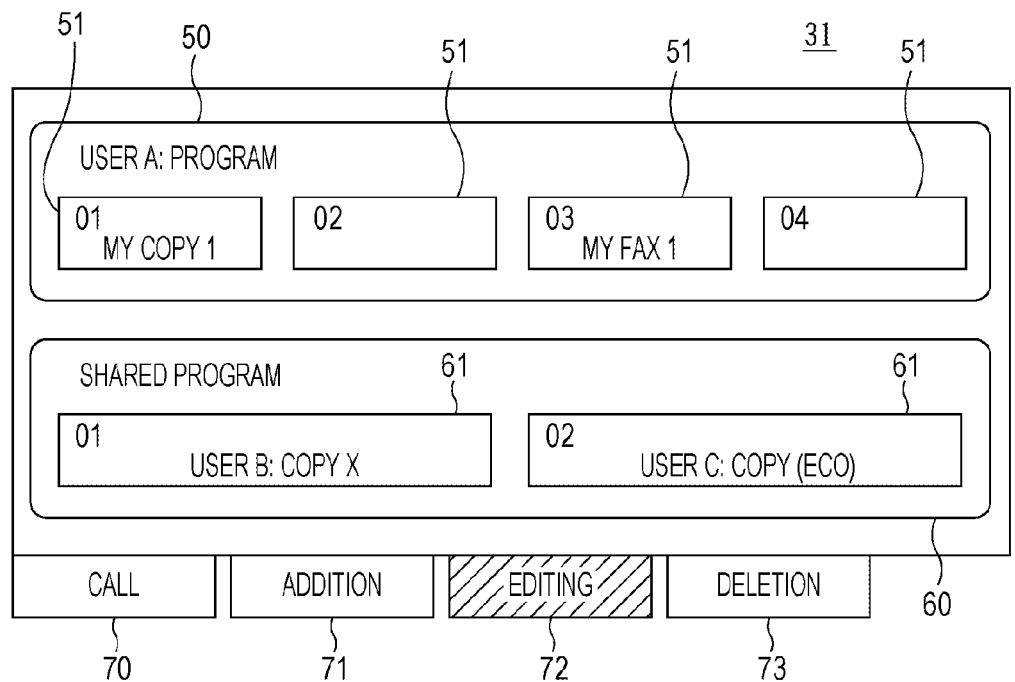
FIG. 19 is a configuration diagram of an initial screen in a mode of editing a program according to the embodiment.

With reference to FIG. 19, editing of a program will be now described. FIG. 19 is a configuration diagram of the initial screen 31 in the mode of editing a program. The initial screen 31 is different from the initial screen 10 in the mode of calling a program, as illustrated in FIG. 3, with respect to a highlighted display of a tab. While, in the initial screen 10 illustrated in FIG. 3, the call tab 70 is highlighted and displayed, the editing tab 72 is highlighted and displayed in the initial screen 31 illustrated in FIG. 19.

Various embodiments of the editing of a program may include an embodiment in which an already created program is shared, an embodiment in which a name assigned to one of the program selection keys 51 and a number of the corresponding program selection key 51 are changed, and an embodiment in which a shared program is modified.

Figure 20:
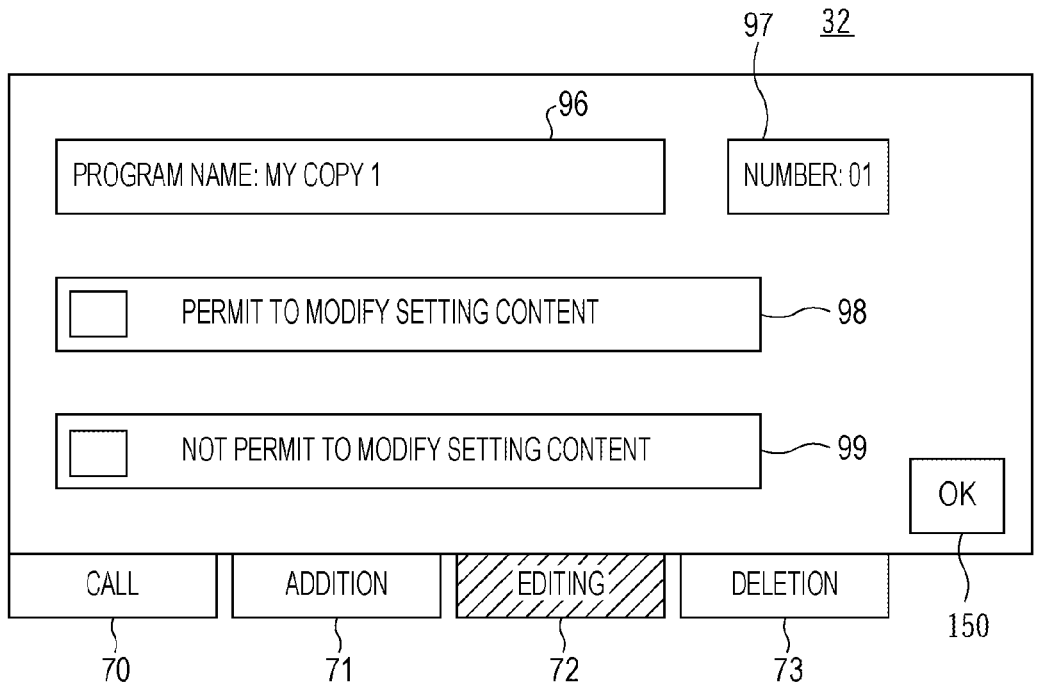
FIG. 20 is a configuration diagram of a screen in the mode of editing a program according to the embodiment.

The embodiment in which an already created program is shared will be described. With reference to FIG. 2 and FIG. 19, in a case where the program allocated to the program selection key 51 indicated by "01" is shared, the user A holds down the program selection key 51 indicated by "01". The display control section 504 switches a screen displayed in the display section 403 from the initial screen 31 to a screen 32 illustrated in FIG. 20.

The screen 32 includes the various kinds of tabs 70 to 73, a name field 96, a key number 97, setting keys 98 and 99, and an OK key 150.

In the name field 96, the name of the program allocated to the program selection key 51 held down is displayed. Here, since the program selection key 51 indicated by "01" is held down, "MY COPY 1" is displayed. The key number 97 displays the number of the program selection key 51 being held down. Here, the number "01" is displayed.

The setting key 98 is the same key as the setting key 77 in FIG. 6, and is a key for setting a user to which authority to modify a setting content is to be assigned, from among users with whom the program is shared. If the setting key 98 is held down, the display control section 504 switches a screen displayed in the display section 403 from the screen 32 to a screen for selecting a user to which the authority to modify the setting content is to be assigned.

Figure 21:
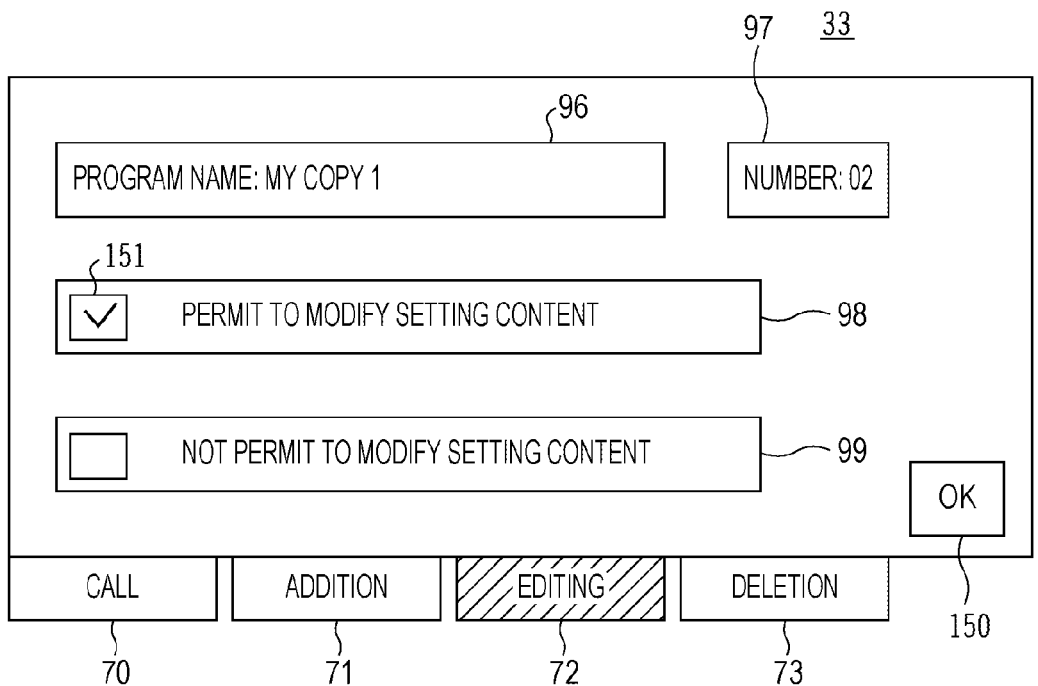
FIG. 21 is a configuration diagram of a screen in the mode of editing a program similar to the screen of FIG. 20.

If the sharing processing section 506 confirms the user to which the authority to modify the setting content has been assigned, the display control section 504 causes the display section 403 to display a screen 33 illustrated in FIG. 21. The screen 33 corresponds to the screen 23 illustrated in FIG. 8. In the screen 33, in the same way as in the screen 23, a check is displayed in a check field 151 of the setting key 98. This check indicates that a user with an assigned authority to modify the setting content is selected.

With reference to FIG. 21, the setting key 99 is the same key as the setting key 78 in FIG. 6, and is a key for not assigning authority to modify the setting content to a user with whom the program is shared. If the setting key 99 is held down, the display control section 504 switches a screen displayed in the display section 403 from the screen 33 to the same screen as the screen 22 already described and illustrated in FIG. 7.

Figure 22:
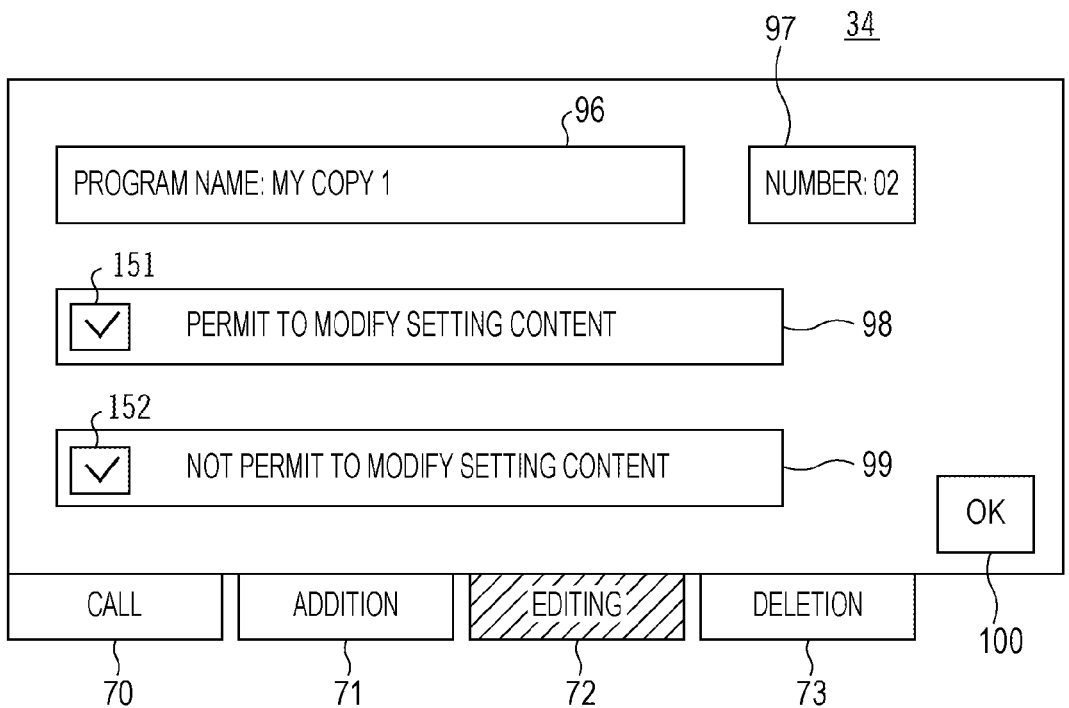
FIG. 22 is a configuration diagram of a screen in the mode of editing a program similar to the screen of FIG. 20.

If the sharing processing section 506 confirms the user to whom no authority to modify a setting content has been assigned, the display control section 504 causes the display section 403 to display a screen 34 illustrated in FIG. 22. The screen 34 corresponds to the screen 24 illustrated in FIG. 9. In the screen 34, in the same way as in the screen 24, a check is displayed in the check field 152 of the setting key 99. This check indicates that the user with no assigned authority to modify the setting content is selected. As described above, after the user A serving as the first user is authenticated in the authentication section 501, when an input for assigning, to the second user, authority to modify the content of a setting indicated by a shared program is performed using the operation section 400, the sharing processing section 506 perform a registration for assigning that authority to the second user. When an input for not assigning, to the second user, the authority to modify the content of a setting is performed, the sharing processing section 506 performs a registration for not assigning that authority to the second user.

If the OK key 150 is held down, the sharing processing section 506 completes processing for causing the already created program to be shared. In this way, the shared program and the second user are specified using the operation section 400 after the user A serving as the first user is authenticated in the authentication section 501, and the sharing processing section 506 performs processing for associating the second user and the shared program with each other.

Figure 23:
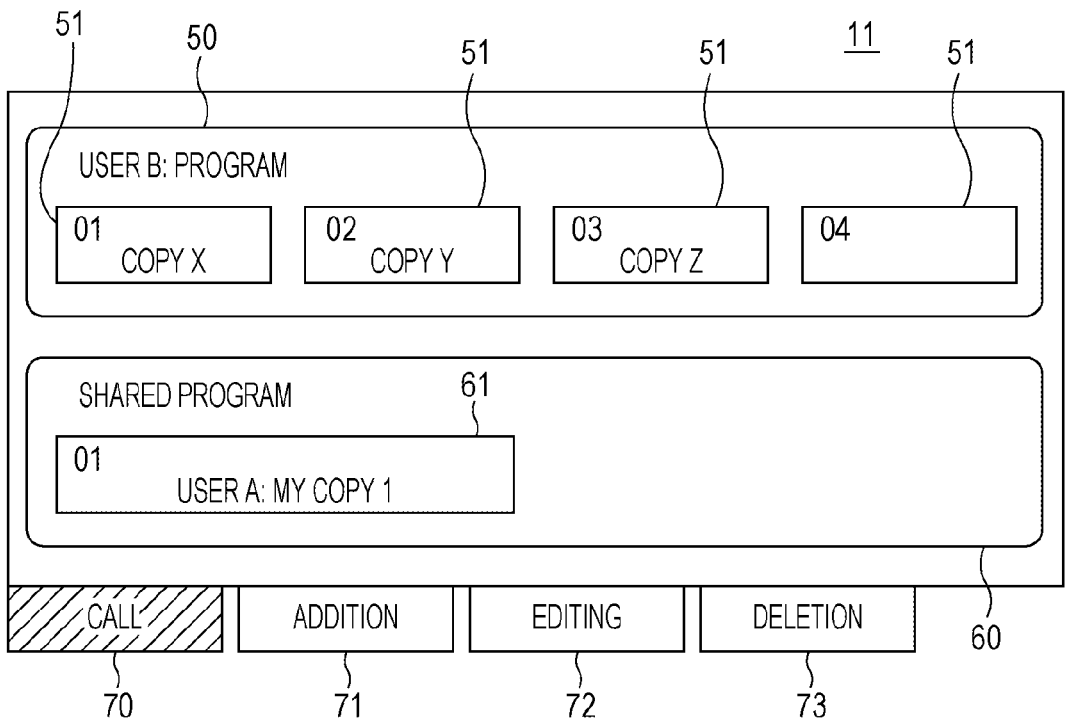
FIG. 23 is a configuration diagram of another initial screen in the mode of calling a program according to the embodiment.

A result obtained by performing processing for causing an already created program to be shared will be described using the user B as an example of a user permitted to use a shared program. After the user B is authenticated in the authentication section 501, the display control section 504 causes the display section 403 to display an initial screen 11 in the mode of calling a program, illustrated in FIG. 23. The shared program selection key 61 indicated by "01" is included in the initial screen 11. A character image of "USER A: MY COPY 1" is synthesized in the shared program selection key 61. Under the condition that the user B serving as the second user is authenticated in the authentication section 501, the display control section 504 causes the display section 403 to display a screen (the initial screen 11) indicating the shared program. As a result, the user B is able to recognize that the user A permits the program named "MY COPY 1" to be shared.

The initial screen 11 doubles as a screen indicating a shared program and a selection screen for selecting a program. While, in the above-mentioned embodiment, the screen indicating a shared program and the selection screen are equal to each other, embodiments of the present disclosure are not limited to such case.

As described above, in the present embodiment, the shared program and the second user are specified using the operation section 400 after the first user is authenticated in the authentication section 501. As such, the sharing processing section 506 performs processing for associating the second user and the shared program with each other. Under the condition that the second user is authenticated in the authentication section 501, the display control section 504 causes the display section 403 to display a screen indicating the shared program.

In this way, according to the present embodiment, when a user permits to share a program with another user, it is possible to preliminarily specify the user with whom the program is permitted to be shared. In addition, while it is possible for the specified user to find out about the existence of the shared program, it is difficult for a user who is not specified to find out about the existence of the shared program. Accordingly, it is possible to reject sharing a program with a user asking for sharing of the program or to cause an unknown user to have no ability to ask for permission of sharing of a program.

As the editing of a program, the embodiment in which a name assigned to one of the program selection keys 51 and a number of the corresponding program selection key 51 are changed will be now described. If, in the initial screen 31 in the mode of editing a program, as illustrated in FIG. 19, one of the program selection keys 51 to which a name of a program is assigned (e.g., the program selection key 51 indicated by "01") is held down, the display control section 504 causes the screen 28 illustrated in FIG. 13 to be superimposed and displayed on the initial screen 31.

In the name entry field 91, a new name of a program is input by the operation section 400. The number entry field 92 is a field in which a number of one of the program selection keys 51 in which the name input in the name entry field 91 is to be indicated is input using the operation section 400. If the OK key 94 is held down, the program processing section 503 performs a registration for switching from the program selection key 51 indicated by "01" to the program selection key 51 of the number input in the number entry field 92. The display control section 504 causes an image indicating the name of a program input in the name entry field 91 to be synthesized in the program selection key 51.

With reference to FIG. 19, as the editing of a program, the embodiment in which a shared program is modified will be now described. With reference to the initial screen 31 in the mode of editing a program, illustrated in FIG. 19, the authority to modify the shared program named "MY COPY X" allocated to the shared program selection key 61 indicated by "01" is assigned to the user A.

If the user A holds down the shared program selection key 61 indicated by "01", the program processing section 503 determines whether or not the authority to modify the shared program named "MY COPY X" is assigned to the user A. In addition, the display control section 504 switches a screen displayed in the display section 403 from the initial screen 31 to a screen 35 illustrated in FIG. 24. In addition, in a case where the authority to modify the shared program named "COPY X" is not assigned to the user A, the display control section 504 causes the display section 403 to display a screen indicating that it is not able to modify the shared program.

Figure 24:
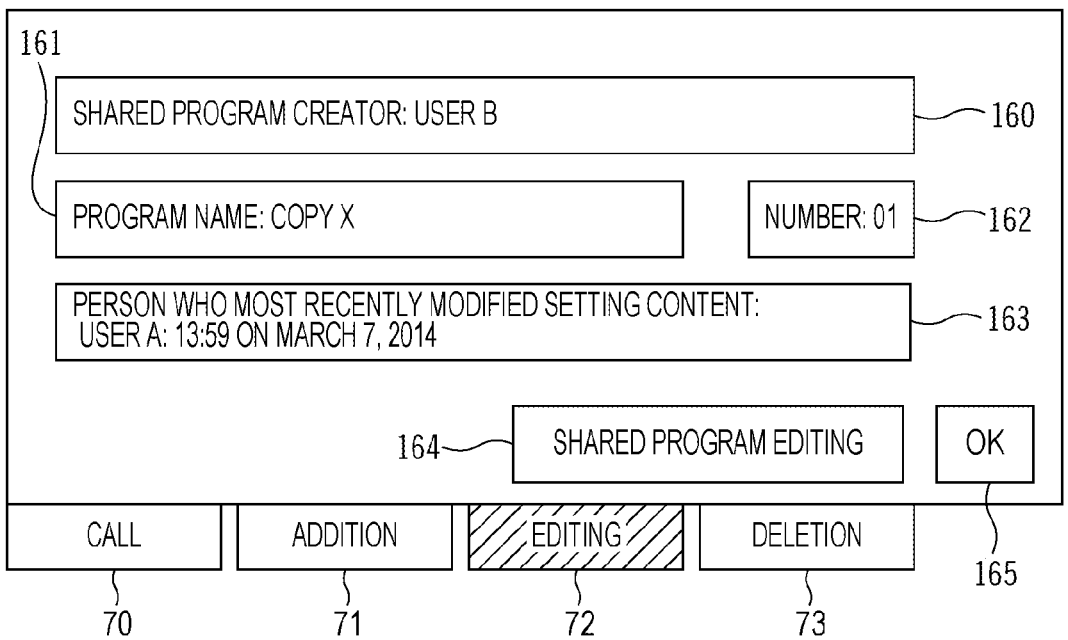
FIG. 24 is a configuration diagram of another screen in the mode of editing a program according to the embodiment.

The screen 35 illustrated in FIG. 24 includes the various kinds of tabs 70 to 73, a creator field 160, a name field 161, a key number 162, a modification history field 163, a shared program editing key 164, and an OK key 165.

In the creator field 160, a user ID indicating a name of a user who created the shared program is displayed. Here, "USER B" is displayed. In the name field 161, a name assigned to the shared program is displayed. Here, as the name, "COPY X" is displayed. In the key number 162, a number of the shared program selection key 61 is displayed. Here, "01" is displayed.

In the modification history field 163, a name of a user who recently modified the shared program and date and time of the modification are displayed. Here, that the user A modified the shared program at 13:59 on Mar. 7, 2014 is displayed. The user B, who is the creator of the program, is able to modify the shared program named "COPY X". Since the authority to modify that shared program is assigned to the user A, the user A is able to modify it.

If the shared program editing key 164 is held down, the display control section 504 reads a setting indicated by the shared program named "COPY X" from the storage section 502, and causes the display section 403 to display a setting screen in which that setting is reflected, such as the setting screen 700 illustrated in FIG. 5. In addition, a setting desired to be modified is modified using the operation section 400, and the OK key 705 is held down. As a result, the display control section 504 switches a screen displayed in the display section 403 to the screen 35. If the OK key 165 is held down, the program processing section 503 reflects the content of the modified setting in the shared program named "COPY X" stored in the storage section 502.

As described with reference to FIG. 9 and FIG. 22, as for the processing for modifying a shared program, after the user A serving as the first user is authenticated in the authentication section 501, when an input for assigning authority to the second user to modify the content of a setting indicated by the shared program is performed using the operation section 400, the sharing processing section 506 performs a registration for assigning the authority to the second user. In addition, when an input for not assigning the authority to the second user is performed, the sharing processing section 506 performs a registration for not assigning the authority to the second user.

Further, when that second user modifies the content of a setting using the operation section 400, the program processing section 503 reflects the modified content of the setting in the shared program stored in the storage section 502. A program for causing the image forming apparatus 1 to execute a job is overwritten in accordance with the setting content after the modification.

Therefore, according to the present embodiment, it is possible for the first user to assign the authority to the second user or to assign no authority to the second user. In addition, in a case where there are multiple second users, the sharing processing section 506 registers whether or not to assign the authority for each second user. Therefore, it is possible to individually assign authority or no authority to each of the second users.

Figure 25:
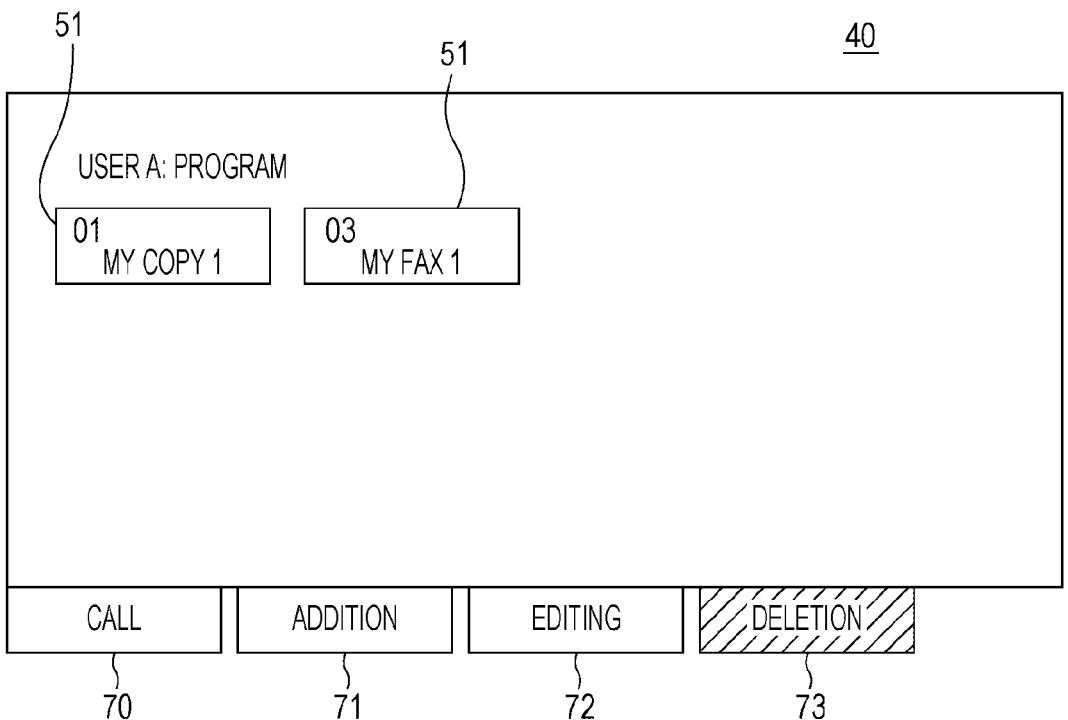
FIG. 25 is a configuration diagram of an initial screen in the mode of deleting a program according to the embodiment.

With reference to FIG. 25, deletion of a program will be described. FIG. 25 is a configuration diagram of the initial screen 40 in the mode of deleting a program. The initial screen 40 includes one of the program selection keys 51 to which a program is allocated, from among the program selection keys 51. Here, the program selection key 51 indicated by "01" and the program selection key 51 indicated by "03" are illustrated. Programs allocated to those program selection keys 51 are deletable programs.

Since a shared program allocated to one of the shared program selection keys 61 (as illustrated in FIG. 3) is not a program created by the user A, such program is not included in deletion targets.

The initial screen 40 includes the call tab 70, the addition tab 71, the editing tab 72, and the deletion tab 73.

Figure 26:
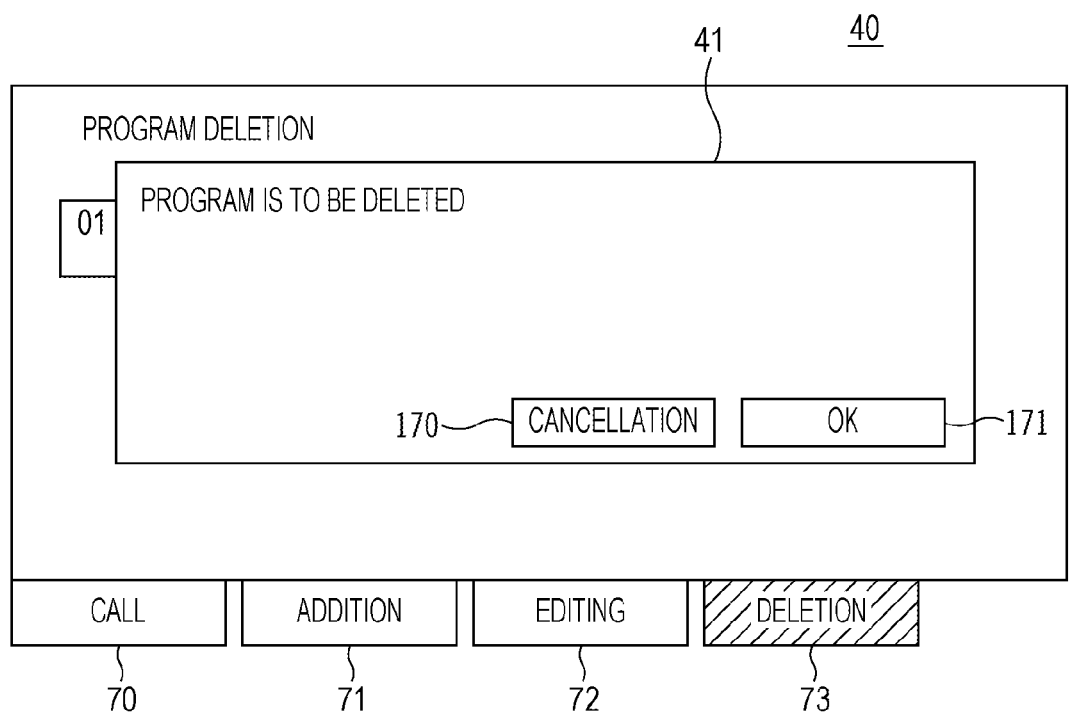
FIG. 26 is a configuration diagram of a screen superimposed on the screen of FIG. 25.

Deletion of the program allocated to the program selection key 51 indicated by "01" will be used as an example to describe the deletion of a program. First, a case where this program is not permitted to be shared will be described. With reference to FIG. 2 and FIG. 25, if the user A holds down the program selection key 51 indicated by "01", the display control section 504 causes a screen 41 to be superimposed and displayed on the initial screen 40 displayed in the display section 403, as illustrated in FIG. 26.

The screen 41 includes a character image of a message indicating that the program is to be deleted. In addition, the screen 41 includes a cancellation key 170 and an OK key 171.

If the cancellation key 170 is held down, the display control section 504 erases the screen 41 from the display section 403. From this, the display control section 504 causes the display section 403 to display the initial screen 40 illustrated in FIG. 25.

If the OK key 171 is held down, the program processing section 503 performs processing for deleting, from the storage section 502, the program allocated to the program selection key 51 indicated by "01".

Figure 27:
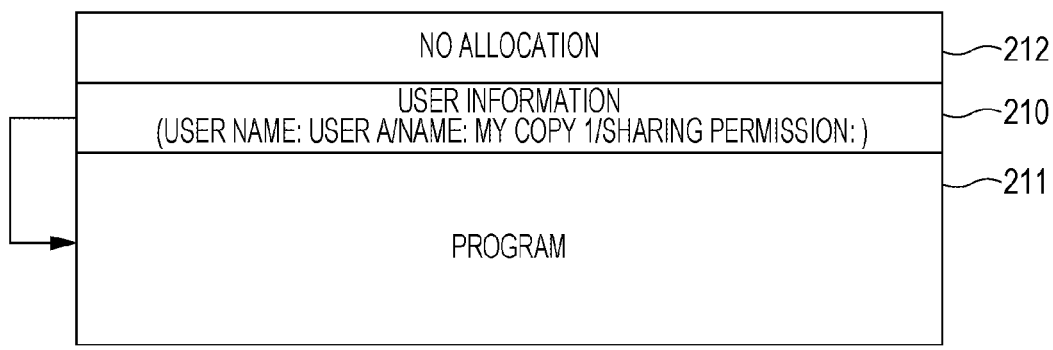
FIG. 27 is a block diagram of a portion of the storage section before a program not permitted to be shared is deleted, according to the embodiment.

With reference to FIG. 27, states of the storage section 502 before and after this program is deleted will be described. FIG. 27 is a block diagram illustrating a portion of the storage section 502 before a program is deleted. In the storage area 210 in the storage section 502, user information is stored. The user information includes a name of user who creates a program (in this case, the "USER A") and the "MY COPY 1" serving as a name assigned to that program. In addition, when the program is shared with another user, the user information further includes a name of the user with whom the program is shared.

In the storage area 211 of the storage section 502, the program associated with the user information stored in the storage area 210 is stored. In FIG. 27, the storage area 212 of the storage section 502 is a storage area not in use.

Figure 28:
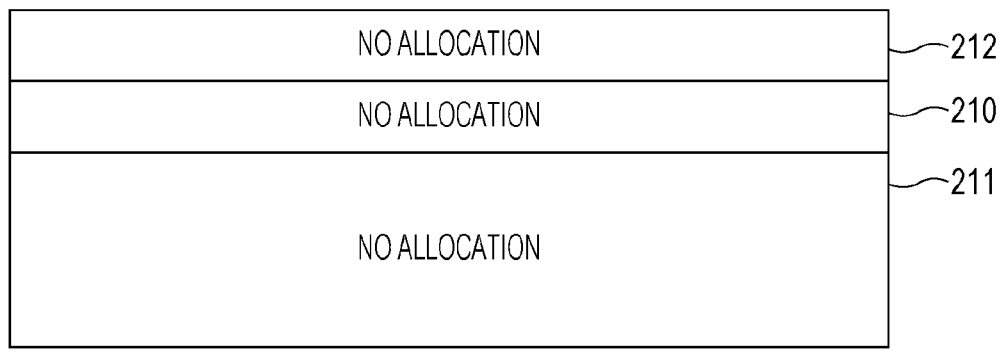
FIG. 28 is a block diagram of a portion of the storage section after the program not permitted to be shared is deleted, according to the embodiment is deleted.

With reference to FIG. 28, a portion of the storage section 502 after the program is deleted will be described. FIG. 28 is a block diagram illustrating the portion of the storage section 502 after the program is deleted. Since the user information is deleted from the storage area 210 and the program is deleted from the storage area 211, these storage areas are now not in use.

Figure 29:
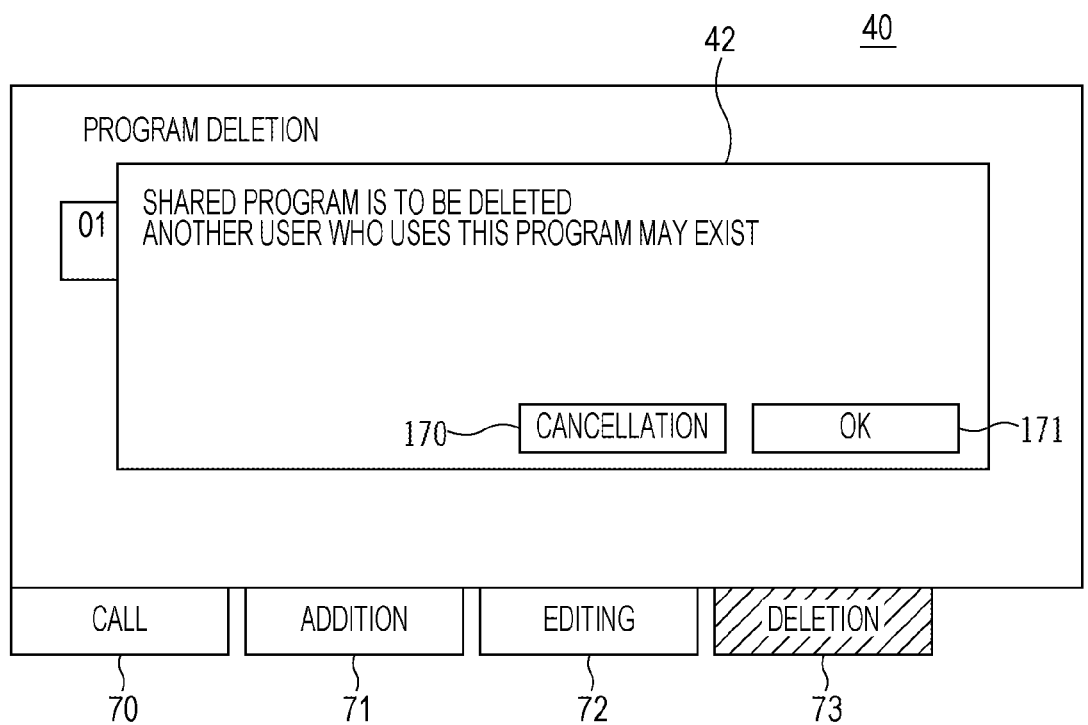
FIG. 29 is a configuration diagram of a screen superimposed on the screen of FIG. 25.

Next, a deletion in the case where the program allocated to the program selection key 51 indicated by "01" is permitted to be shared will be described. Referring back to FIG. 2 and FIG. 25, if the user A holds down the program selection key 51 indicated by "01", the display control section 504 causes a screen 42 to be superimposed and displayed on the initial screen 40 displayed in the display section 403, as illustrated in FIG. 29. The screen 42 is different from the screen 41 illustrated in FIG. 26 in that a character image of a message indicating a possibility that another user uses the program is included therein.

If the OK key 171 is held down, the program processing section 503 deletes, from the storage section 502, the program allocated to the program selection key 51 indicated by "01".

Figure 30:
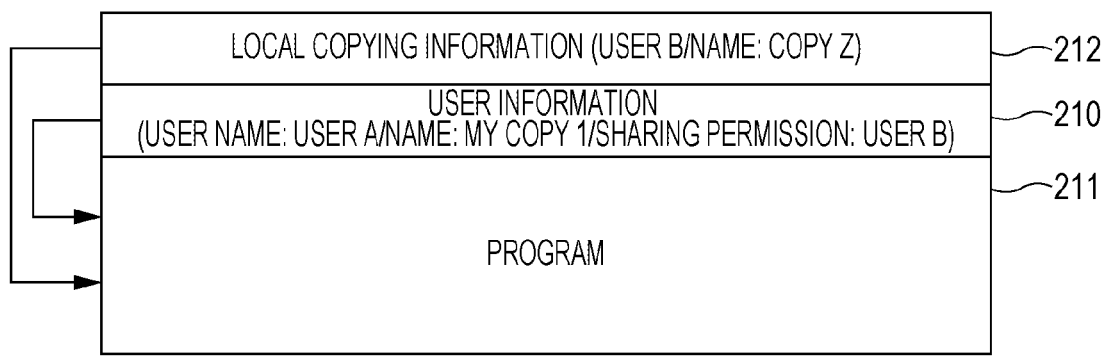
FIG. 30 is a block diagram illustrating a portion of the storage section before a program is deleted when local copying processing is performed, according to the embodiment.

States of the storage section 502 before and after this program is deleted from the storage section 502 will be described. The states are different depending on whether a user permitted to use the shared program performs local copying or does not perform the local copying. With reference to FIG. 30, first, the case in which the local copying is performed will be described. FIG. 30 is a block diagram illustrating a portion of the storage section 502 before the program is deleted in such case. In the storage area 210 of the storage section 502, user information is stored. The user information includes a name of user who creates a program (in this case, the "USER A") and the "MY COPY 1" serving as a name assigned to that program. In addition, when the program is shared with another user, the user information further includes a name of the user with whom the program is shared. In this case, the user name includes a user name of the user B.

In the storage area 211 of the storage section 502, the program associated with the user information stored in the storage area 210 is stored. In the storage area 212, local copying information is stored. The local copying information stores the "USER B" serving as a user name of the user who performs the local copying, and "A COPY Z" serving as a name assigned to the shared program by the user who performs the local copying. The user name is a user ID of a user authenticated in the authentication section 501.

Figure 31:
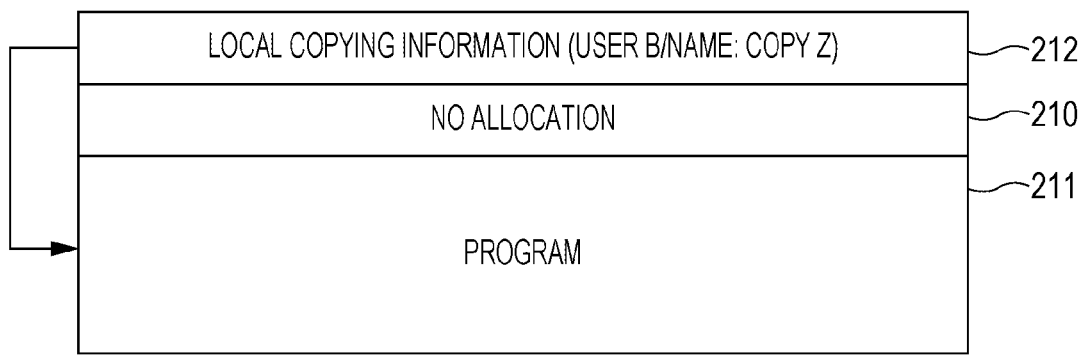
FIG. 31 is a block diagram illustrating a portion of the storage section after the program is deleted when the local copying processing is performed, according to the embodiment.

FIG. 31 is a block diagram illustrating a portion of the storage section 502 after the program is deleted. While the user information is deleted from the storage area 210, the program is not deleted from the storage area 211. Accordingly, the user B with whom the program is shared program is able to continuously use the program.

Figure 32:
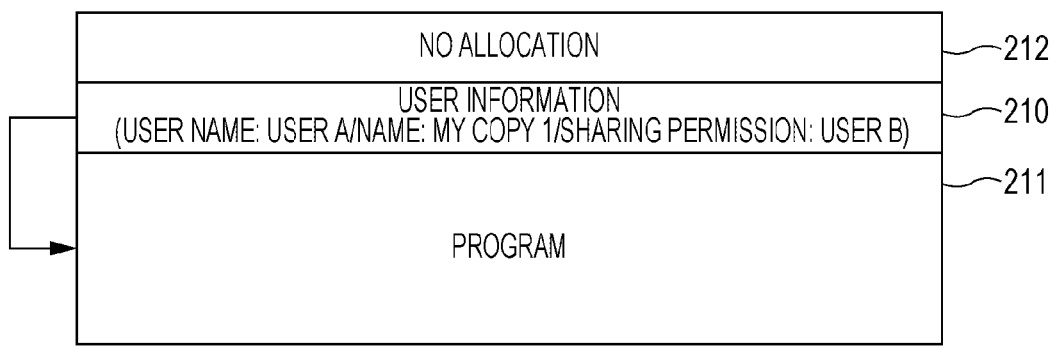
FIG. 32 is a block diagram illustrating a portion of the storage section before a program is deleted when the local copying is not performed, according to the embodiment.

Subsequently, with reference to FIG. 32, the case where the local copying processing is not performed will be described. FIG. 32 is a block diagram illustrating a portion of the storage section 502 before the program is deleted when the local copying processing is not performed. In the storage area 210, user information is stored. The user information is the same as the user information illustrated in FIG. 30. In the same way as in the storage area 211 in FIG. 30 and in the storage area 211 in FIG. 32, a program associated with the user information stored in the storage area 210 in FIG. 32 is stored. Since the local copying processing is not performed, local copying information is not stored in the storage area 212. As such, storage area 212 is a storage area not in use.

Figure 33:
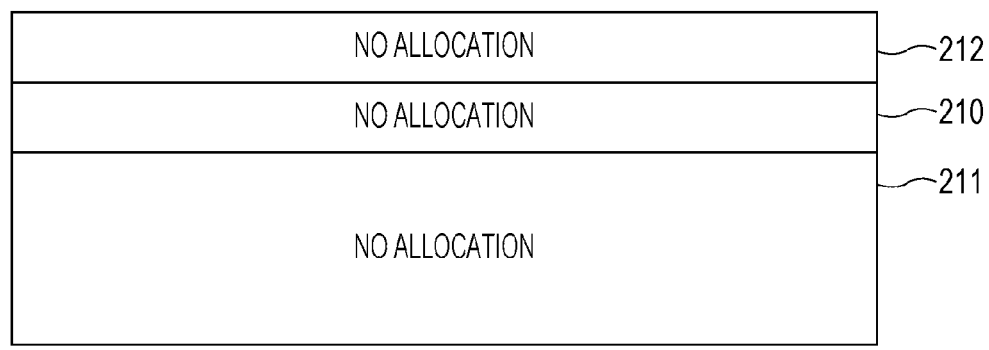
FIG. 33 is a block diagram illustrating a portion of the storage section after the program is deleted when the local copying is not performed, according to the embodiment.

FIG. 33 is a block diagram illustrating a portion of the storage section 502 after the program is deleted. The user information is erased from the storage area 210. Since a user permitted to use a shared program does not perform the local copying, the shared program is erased from the program storage area 211.

Now, a deletion of a shared program allocated to one of the program selection keys 51 will be described. If a program to be deleted is specified and an instruction for deletion is issued using the operation section 400 after the user A serving as the first user is authenticated in the authentication section 501, the program processing section 503 determines whether or not the program is a shared program. When the program is a shared program, the program processing section 503 determines whether or not local copying processing is performed on the program, and if the local copying processing is not performed, the program processing section 503 performs first processing for deleting the user information and the program from the storage section 502 (see FIG. 32 and FIG. 33). On the other hand, if local copying processing is performed, the program processing section 503 performs second processing for not deleting the program from the storage section 502 while deleting the user information from the storage section 502 (see FIG. 30 and FIG. 31).

In this way, according to the present embodiment, when the user A serving as the first user who permits to share a program issues an instruction to delete that shared program, and if the local copying processing is performed on the shared program, the processing for not deleting the shared program from the storage section 502 while deleting the user information from the storage section 502 is performed (see FIG. 30 and FIG. 31). Accordingly, it is possible for the user B serving as the second user permitted to use the shared program to continuously use the shared program.

Since targets to be deleted are different depending on the first processing and the second processing, the following example of a modification is available instead of displaying the screen 42 illustrated in FIG. 29. When the local copying processing is not performed, the display control section 504 causes the display section 403 to display, before the first processing is performed, a first screen including a message indicating that the user information and the program are to be deleted. When an input accepting the deletion is performed in the first screen, the program processing section 503 performs the first processing.

When the local copying processing is performed, the display control section 504 causes the display section 403 to display, before the second processing is performed, a second screen including a message indicating that the program is not to be deleted. When an input for accepting the deletion is performed in the second screen, the program processing section 503 performs the second processing.

As an example of a modification, when the first processing is performed, it is possible to cause the first user to recognize that the user information and the program are to be deleted, and when the second processing is performed, it is possible to cause the first user to recognize that only the user information is to be deleted and the program is not to be deleted.

While, in the present embodiment, the image forming apparatus 1 has been used as an example of an electronic device and described, the present disclosure may be applied to electronic devices other than the image forming apparatus 1.

What is claimed is:

1. An electronic device comprising:
an authentication section configured to authenticate a user of the electronic device;
an operation section that includes a display section and is configured to operate the electronic device;
a storage section configured to store programs that each cause the electronic device to perform a job in accordance with a preliminarily set content;
a program processing section configured (i) to generate a program out of the programs based on a setting performed in the operation section and an instruction to generate the program issued in the operation section after the user is authenticated in the authentication section, (ii) to cause the storage section to store the generated program, and (iii) to associate the generated program with the authenticated user;
a display control section configured to cause the display section to display a selection screen for selecting, from among the programs stored in the storage section, the program associated with the authenticated user;
a job control section configured to read, from the storage section, the program selected in the selection screen and to cause the electronic device to execute a job in accordance with a content of a setting indicated by the read program; and
a sharing processing section configured to perform processing in which a user who permits to share the program is a first user and a user permitted to use a shared program is a second user, the sharing section being configured to associate the second user and the shared program with each other, and the second user being specified by the first user via the operation section after the first user is authenticated in the authentication section,
wherein,
when the second user is authenticated in the authentication section, the display control section is configured to cause the display section to display a screen indicating the shared program.

2. The electronic device according to claim 1, wherein:
the display control section further includes a plurality of program selection keys and one or more shared program selection keys, and is configured to cause the display section to display the selection screen, and
when one of the program selection keys to which a program is allocated is selected from among the plurality of program selection keys, the job control section is configured to read, from the storage section, the program allocated to the selected program selection key, and to cause the electronic device to execute a job in accordance with a content of a setting indicated by the read program, and
when one of the one or more shared program selection keys is selected, the job control section is configured to read, from the storage section, a shared program allocated to the selected shared program selection key, and to cause the electronic device to execute a job in accordance with a content of a setting indicated by the read shared program.

3. The electronic device according to claim 2, wherein:
a local copying processing section is configured to perform, after the second user is authenticated in the authentication section, local copying processing for allocating the shared program to one of the plurality of program selection keys by specifying the shared program and one of the plurality of program selection keys using the operation section,
the display control section is configured to cause the display section to display the selection screen including a program selection key to which the shared program is allocated, and
when the program selection key to which the shared program is allocated is selected, the job control section is configured to read the shared program from the storage section and to cause the electronic device to execute a job in accordance with the content of the setting indicated by the shared program.

4. The electronic device according to claim 3, wherein:
the program processing section is configured to associate user information for identifying the first user and the program with each other, and to cause the storage section to store the user information and the program,
the local copying processing section is configured to cause the storage section to store local copying information that includes an ID of the second user while associating the local copying information with the shared program, and
when, after the first user is authenticated in the authentication section, a program to be deleted is specified using the operation section, the program processing section is configured to determine, based on an instruction for deletion, whether or not the program to be deleted is the shared program, and if the program is the shared program, the program processing section is further configured to determine whether or not the local copying processing is performed on the shared program,
if the local copying processing is not performed, the program processing section is configured to execute first processing for deleting the user information and the program from the storage section, and
if the local copying processing is performed, the program processing section is configured to execute a second processing for not deleting the program from the storage section while deleting the user information from the storage section.

5. The electronic device according to claim 4, wherein:
if the local copying processing is not performed, the display control section is configured to cause the display section to display, before the first processing and as a first screen, a message indicating that the user information and the program are to be deleted, and
when an input for accepting the deletion is performed in the first screen, the program processing section is configured to execute the first processing.

6. The electronic device according to claim 5, wherein:
if the local copying processing is performed, the display control section is configured to cause the display section to display, before the second processing and as a second screen, a message indicating that the user information is to be deleted and the program is not to be deleted, and
when an input for accepting the deletion is performed in the second screen, the program processing section is configured to execute the second processing.

7. The electronic device according to claim 6, wherein:
after the first user is authenticated in the authentication section, the sharing processing section is configured to assign authority to modify the content of the setting indicated by the shared program to the second user when an input for assigning the authority to the second user is performed in the operation section, the sharing processing section is configured not to assign the authority to the second user when an input for not assigning the authority to the second user is performed, and when two or more second users exist, the sharing processing section is configured to select whether or not to assign the authority for each second user, and
when the second user selected to have the authority modifies the content of the setting using the operation section, the program processing section is configured to reflect the modified content of the setting in the shared program stored in the storage section.

8. The electronic device according to claim 5, wherein:
after the first user is authenticated in the authentication section, the sharing processing section is configured to assign authority to modify the content of the setting indicated by the shared program to the second user when an input for assigning the authority to the second user is performed in the operation section, the sharing processing section is configured not to assign the authority to the second user when an input for not assigning the authority to the second user is performed, and when two or more second users exist, the sharing processing section is configured to select whether or not to assign the authority for each second user, and
when the second user selected to have the authority modifies the content of the setting using the operation section, the program processing section is configured to reflect the modified content of the setting in the shared program stored in the storage section.

9. A computer-readable non-transitory recording medium storing a display control program that, when executed by a computer, causes the computer to:
authenticate a user of an electronic device;
store programs that each cause the electronic device to perform a job in accordance with a preliminarily set content;
generate a program out of the programs based on a setting performed in the electronic device and an instruction to generate the program issued in the electronic device after the user is authenticated, cause a storage of the generated program, and associate the generated program with the authenticated user;
cause the electronic device to display a selection screen for selecting, from among the stored programs, the program associated with the authenticated user;
read the program selected in the selection screen and cause the electronic device to execute a job in accordance with a content of the setting indicated by the read program;
perform processing in which a user who permits to share the program is a first user and a user permitted to use a shared program is a second user, the second user and the shared program being associated with each other, and the second user being specified by the first user after the first user is authenticated; and
when the second user is authenticated, cause the electronic device to display a screen indicating the shared program.

10. The medium according to claim 9, wherein the electronic device includes a plurality of program selection keys and one or more shared program selection keys, and the display control program, when executed by the computer, further causes the computer to:
when one of the program selection keys to which a program is allocated is selected from among the plurality of program selection keys, read the program allocated to the selected program selection key and cause the electronic device to execute a job in accordance with a content of a setting indicated by the read program, and
when one of the one or more shared program selection keys is selected, read a shared program allocated to the selected shared program selection key, and cause the electronic device to execute a job in accordance with a content of a setting indicated by the read shared program.

11. The medium according to claim 10, wherein the display control program, when executed by the computer, further causes the computer to:
after the second user is authenticated, perform local copying processing for allocating the shared program to one of the plurality of program selection keys.

12. The medium according to claim 11, wherein the display control program, when executed by the computer, further causes the computer to:
determine if a program to be deleted by the first user is the shared program, and if the program is the shared program, further determine whether or not the local copying processing is performed on the shared program,
if the local copying processing is not performed, execute first processing for deleting the program and user information associated with the program, and
if the local copying processing is performed, execute a second processing for not deleting the program while deleting the user information.

13. The medium according to claim 12, wherein the display control program, when executed by the computer, further causes the computer to:
if the local copying processing is not performed, cause the electronic device to display, before the first processing and as a first screen, a message indicating that the user information and the program are to be deleted, and
when an input for accepting the deletion is performed in the first screen, execute the first processing, and
if the local copying processing is performed, cause the electronic device to display, before the second processing and as a second screen, a message indicating that the user information is to be deleted and the program is not to be deleted, and when an input for accepting the deletion is performed in the second screen, execute the second processing.

14. A display control method, comprising:

authenticating a user of an electronic device;

storing programs that each cause the electronic device to perform a job in accordance with a preliminarily set content;

generating a program out of the programs based on a setting performed in the electronic device and an instruction to generate the program issued in the electronic device after the user is authenticated in the authentication step, causing a storage of the generated program, and associating the generated program with the authenticated user;

causing the electronic device to display a selection screen for selecting, from among the stored programs, the program associated with the authenticated user;

reading the program selected in the selection screen and causing the electronic device to execute a job in accordance with a content of the setting indicated by the read program;

performing processing in which a user who permits to share the program is a first user, a user permitted to use a shared program is a second user, the second user and the shared program being associated with each other, and the second user being specified by the first user after the first user is authenticated in the authentication step; and when the second user is authenticated in the authentication step, causing the electronic device to display a screen indicating the shared program.

15. The method according to claim 14, wherein the electronic device includes a plurality of program selection keys and one or more shared program selection keys, and the display control program, the method further comprising:

when one of the program selection keys to which a program is allocated is selected from among the plurality of program selection keys, reading the program allocated to the selected program selection key and causing the electronic device to execute a job in accordance with a content of a setting indicated by the read program, and when one of the one or more shared program selection keys is selected, reading a shared program allocated to the selected shared program selection key, and causing the electronic device to execute a job in accordance with a content of a setting indicated by the read shared program.

16. The method according to claim 15, further comprising:

after the second user is authenticated, performing local copying processing for allocating the shared program to one of the plurality of program selection keys.

17. The method according to claim 16, further comprising:

determining if a program to be deleted by the first user is the shared program, and if the program is the shared program, further determining whether or not the local copying processing is performed on the shared program, if the local copying processing is not performed, executing first processing for deleting the program and user information associated with the program, and if the local copying processing is performed, executing a second processing for not deleting the program while deleting the user information.

18. The method according to claim 17, further comprising:

if the local copying processing is not performed, causing the electronic device to display, before the first processing and as a first screen, a message indicating that the user information and the program are to be deleted, and when an input for accepting the deletion is performed in the first screen, executing the first processing, and if the local copying processing is performed, causing the electronic device to display, before the second processing and as a second screen, a message indicating that the user information is to be deleted and the program is not to be deleted, and when an input for accepting the deletion is performed in the second screen, executing the second processing.

* * * * *